(12) United States Patent
Hansen et al.

(10) Patent No.: US 10,726,430 B2
(45) Date of Patent: Jul. 28, 2020

(54) SYSTEM, METHOD AND COMPUTER PROGRAM FOR IMPROVED FORECASTING RESIDUAL VALUES OF A DURABLE GOOD OVER TIME

(71) Applicant: ALG, Inc., Santa Monica, CA (US)

(72) Inventors: Morgan Scott Hansen, Los Angeles, CA (US); Brian Izumi Abe, Santa Monica, CA (US); Oliver Thomas Sidney Strauss, Santa Barbara, CA (US)

(73) Assignee: ALG, Inc., Santa Monica, CA (US)

( * ) Notice: Subject to any disclaimer, the term of this patent is extended or adjusted under 35 U.S.C. 154(b) by 0 days.

(21) Appl. No.: 16/562,939

(22) Filed: Sep. 6, 2019

(65) Prior Publication Data
US 2019/0392461 A1 Dec. 26, 2019

Related U.S. Application Data

(63) Continuation of application No. 15/729,719, filed on Oct. 11, 2017, now Pat. No. 10,430,814, which is a
(Continued)

(51) Int. Cl.
*G06Q 30/02* (2012.01)
*G06Q 10/04* (2012.01)
(Continued)

(52) U.S. Cl.
CPC ......... *G06Q 30/0202* (2013.01); *G06Q 10/04* (2013.01); *G06Q 10/10* (2013.01);
(Continued)

(58) Field of Classification Search
CPC ........................................... G06Q 10/00–50/00
(Continued)

(56) References Cited

U.S. PATENT DOCUMENTS

| 5,774,873 A | 6/1998 | Berent et al. |
| 6,006,201 A | 12/1999 | Berent et al. |

(Continued)

OTHER PUBLICATIONS

International Search Report and Written Opinion issued for PCT Application No. PCT/US2013/054986, dated Mar. 25, 2014, 7 pages.
(Continued)

*Primary Examiner* — Alan S Miller
(74) *Attorney, Agent, or Firm* — Sprinkle IP Law Group

(57) ABSTRACT

A residual value forecasting system may utilize heterogeneous data, such as used market data, industry-specific data, and non-industry-specific data, from disparate data sources to produce residual value forecasts of an item based on a sophisticated residual value forecasting model particularly configured for agility. The system can dynamically and quickly adapt to change in data inputs and produce custom outputs. The system may determine a baseline value for an item using the used market data, a microeconomic factor using the industry-specific data, and a macroeconomic factor using the non-industry-specific data, as well as adjustments such as locality adjustments and modifications. Given the macroeconomic factor and the microeconomic factor relative to the locality-adjusted value of the item and in view of the competitive sets of similar and/or substitute items in the same industry, the system can generate an accurate forecast residual value of the item at a future time point.

20 Claims, 11 Drawing Sheets

Related U.S. Application Data continuation-in-part of application No. 15/423,026, filed on Feb. 2, 2017, now Pat. No. 10,410,227, which is a continuation of application No. 13/967,148, filed on Aug. 14, 2013, now Pat. No. 9,607,310.

(60) Provisional application No. 62/406,786, filed on Oct. 11, 2016, provisional application No. 61/683,522, filed on Aug. 15, 2012.

(51) Int. Cl.
*G06Q 10/10* (2012.01)
*G06Q 10/00* (2012.01)

(52) U.S. Cl.
CPC ......... *G06Q 10/30* (2013.01); *G06Q 30/0205* (2013.01); *G06Q 30/0206* (2013.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,611,726 | B1* | 8/2003 | Crosswhite | G06F 17/18 700/99 |
| 6,745,150 | B1 | 6/2004 | Brieman | |
| 7,050,982 | B2 | 5/2006 | Sheinson | |
| 7,184,974 | B2* | 2/2007 | Shishido | G06Q 30/06 705/26.62 |
| 7,219,080 | B1 | 5/2007 | Wagoner et al. | |
| 7,366,679 | B2* | 4/2008 | Yuyama | G06Q 30/0202 705/7.31 |
| 7,624,065 | B2 | 11/2009 | Schoen et al. | |
| 7,730,019 | B1* | 6/2010 | Graham | G06Q 10/04 |
| 7,835,982 | B2 | 11/2010 | Schoen et al. | |
| 7,921,052 | B2 | 4/2011 | Dabney et al. | |
| 8,090,642 | B1* | 1/2012 | Van Doren | G06Q 40/00 705/35 |
| 8,112,302 | B1 | 2/2012 | Trovero et al. | |
| 8,112,325 | B2 | 2/2012 | Foy et al. | |
| 8,126,881 | B1 | 2/2012 | Sethi et al. | |
| 8,214,275 | B1* | 7/2012 | An | G06Q 20/201 705/20 |
| 8,230,362 | B2 | 7/2012 | Couch | |
| 8,326,845 | B2 | 12/2012 | Sethi et al. | |
| 8,375,037 | B2 | 2/2013 | Sethi et al. | |
| 8,442,908 | B2* | 5/2013 | Niccolini | G06Q 30/0278 705/35 |
| 8,498,915 | B2* | 7/2013 | Eder | G06Q 40/06 705/35 |
| 8,521,619 | B2 | 8/2013 | Perry, III et al. | |
| 8,538,828 | B2 | 9/2013 | Skutta | |
| 8,589,212 | B2 | 11/2013 | Pollak et al. | |
| 8,595,079 | B1* | 11/2013 | Raines | G06Q 30/0201 705/26.1 |
| 8,595,082 | B2 | 11/2013 | Skutta | |
| 8,645,193 | B2* | 2/2014 | Swinson | G06Q 10/06 705/7.35 |
| 8,661,403 | B2* | 2/2014 | Sullivan | G06Q 30/0202 717/100 |
| 8,738,388 | B1 | 5/2014 | An et al. | |
| 8,818,881 | B2 | 8/2014 | Himmerick et al. | |
| 8,868,572 | B2 | 10/2014 | Sethi et al. | |
| 9,103,743 | B2 | 8/2015 | Couch | |
| 9,104,718 | B1 | 8/2015 | Levy et al. | |
| 9,189,960 | B2 | 11/2015 | Couch et al. | |
| 9,324,104 | B1 | 4/2016 | Levy et al. | |
| 9,347,758 | B2 | 5/2016 | Berent et al. | |
| D765,089 | S | 8/2016 | Agee | |
| 9,412,203 | B1 | 8/2016 | Garcia, III et al. | |
| 9,465,873 | B1 | 10/2016 | Franke et al. | |
| 9,466,079 | B2 | 10/2016 | Hygema et al. | |
| D774,523 | S | 12/2016 | Agee | |
| D774,524 | S | 12/2016 | Agee | |
| 9,600,822 | B2 | 3/2017 | Pyle et al. | |
| 9,607,310 | B2 | 3/2017 | Strauss et al. | |
| 10,410,227 | B2 | 9/2019 | Strauss et al. | |
| 10,430,814 | B2 | 10/2019 | Hansen et al. | |
| 10,685,363 | | 6/2020 | Strauss et al. | |
| 2002/0072958 | A1 | 6/2002 | Yuyama | |
| 2002/0077792 | A1* | 6/2002 | Qiu | G06Q 30/02 703/2 |
| 2002/0123951 | A1* | 9/2002 | Olsen | G06Q 40/06 705/36 R |
| 2002/0198822 | A1* | 12/2002 | Munoz | G06Q 40/02 705/38 |
| 2003/0065532 | A1* | 4/2003 | Takaoka | G06Q 30/06 705/80 |
| 2003/0105728 | A1* | 6/2003 | Yano | G06Q 10/06 705/400 |
| 2004/0148241 | A1* | 7/2004 | Qi | G06Q 40/06 705/36 R |
| 2005/0182673 | A1* | 8/2005 | Marzian | G06Q 30/02 705/7.29 |
| 2005/0256760 | A1* | 11/2005 | Siddhanti | G06Q 10/06315 705/7.25 |
| 2006/0129423 | A1 | 6/2006 | Sheinson et al. | |
| 2006/0178973 | A1 | 8/2006 | Chiovari et al. | |
| 2007/0185777 | A1 | 8/2007 | Pyle et al. | |
| 2009/0006118 | A1 | 1/2009 | Pollak | |
| 2009/0144122 | A1* | 6/2009 | Ginsberg | G06Q 10/04 705/7.31 |
| 2009/0157522 | A1* | 6/2009 | Srinivasan | G06Q 30/00 705/26.1 |
| 2009/0177520 | A1* | 7/2009 | Bateni | G06F 16/26 705/7.31 |
| 2010/0070344 | A1* | 3/2010 | Taira | G06Q 30/0621 705/400 |
| 2010/0088158 | A1 | 4/2010 | Pollack | |
| 2010/0161408 | A1 | 6/2010 | Karson et al. | |
| 2010/0274571 | A1 | 10/2010 | McFall et al. | |
| 2010/0274631 | A1 | 10/2010 | McFall et al. | |
| 2010/0318451 | A1 | 12/2010 | Niccolini et al. | |
| 2011/0022525 | A1* | 1/2011 | Swinson | G06Q 30/0278 705/306 |
| 2011/0082804 | A1* | 4/2011 | Swinson | G06Q 30/02 705/306 |
| 2011/0131652 | A1 | 6/2011 | Robinson et al. | |
| 2011/0178953 | A1* | 7/2011 | Johannes | G06Q 40/06 705/36 R |
| 2011/0202471 | A1 | 8/2011 | Scott et al. | |
| 2011/0320414 | A1* | 12/2011 | Sim | G06F 16/95 707/690 |
| 2012/0005070 | A1 | 1/2012 | McFall et al. | |
| 2012/0233014 | A1 | 9/2012 | Banks et al. | |
| 2012/0284087 | A1 | 11/2012 | Pollak | |
| 2012/0284113 | A1 | 11/2012 | Pollak | |
| 2013/0191247 | A1 | 7/2013 | Huang et al. | |
| 2013/0339173 | A1 | 12/2013 | Skutta | |
| 2014/0012901 | A1 | 1/2014 | Ruhl et al. | |
| 2014/0032352 | A1 | 1/2014 | Fraser et al. | |
| 2014/0032353 | A1 | 1/2014 | Fraser et al. | |
| 2014/0058795 | A1 | 2/2014 | Strauss | |
| 2014/0067615 | A1 | 3/2014 | Park et al. | |
| 2014/0089208 | A1 | 3/2014 | Humble et al. | |
| 2014/0207705 | A1 | 7/2014 | Strauss et al. | |
| 2014/0229391 | A1 | 8/2014 | East, III et al. | |
| 2014/0257934 | A1 | 9/2014 | Chrzan et al. | |
| 2014/0258044 | A1 | 9/2014 | Chrzan et al. | |
| 2014/0278806 | A1 | 9/2014 | Duguid et al. | |
| 2014/0279020 | A1 | 9/2014 | Duguid et al. | |
| 2014/0279171 | A1 | 9/2014 | Burgiss et al. | |
| 2014/0279229 | A1 | 9/2014 | Burgiss et al. | |
| 2014/0279275 | A1 | 9/2014 | Burgiss et al. | |
| 2014/0351074 | A1 | 11/2014 | Enge et al. | |
| 2015/0058152 | A1 | 2/2015 | Pollak et al. | |
| 2015/0206206 | A1 | 7/2015 | Puente et al. | |
| 2015/0220876 | A1 | 8/2015 | Sethi et al. | |
| 2015/0221040 | A1 | 8/2015 | Strauss et al. | |
| 2015/0324737 | A1 | 11/2015 | Chrzan et al. | |
| 2015/0324879 | A1 | 11/2015 | Lu et al. | |

(56) References Cited

U.S. PATENT DOCUMENTS

| | | |
|---|---|---|
| 2015/0356672 A1 | 12/2015 | Humble et al. |
| 2016/0343058 A1 | 11/2016 | Levy et al. |
| 2016/0371323 A1 | 12/2016 | Garcia, III et al. |
| 2017/0148040 A1 | 5/2017 | Strauss et al. |
| 2018/0033030 A1 | 2/2018 | Hansen et al. |
| 2019/0347676 A1 | 11/2019 | Strauss et al. |

OTHER PUBLICATIONS

Office Action issued for U.S. Appl. No. 14/031,846, dated Oct. 2, 2014, 12 pages.
Office Action issued for U.S. Appl. No. 13/967,148, dated Apr. 14, 2015, 10 pages.
Office Action issued for U.S. Appl. No. 14/031,846, dated May 4, 2015, 7 pages.
International Preliminary Report on Patentability (IPRP) issued for PCT Application No. PCT/US2013/054986, dated Jun. 18, 2015, 6 pages.
Final Office Action issued for U.S. Appl. No. 14/031,846, dated Aug. 6, 2015, 19 pages.
Bankrate [Retrieved from<<https://web.archive.org/web/20111224082852/http://www.bankrate.com/finance/auto/what-factors-affect-car-resale-value-1.aspx>>], Wayback Machine, Dec. 11, 2011, 3 pages.
Office Action issued for U.S. Appl. No. 13/967,148, dated Sep. 22, 2015, 24 pages.
Office Action issued for Canadian Patent Application No. 2,881,812, dated Apr. 20, 2016, 4 pages.
Extended European Search Report issued for European Patent Application No. 13829187.7, dated Apr. 25, 2016, 6 pages.
Office Action issued for U.S. Appl. No. 13/967,148, dated May 17, 2016, 22 pages.
Office Action issued for U.S. Appl. No. 14/031,846, dated May 5, 2017, 17 pages.
Office Action issued for European Patent Application No. 13829187.7, dated May 12, 2017, 5 pages.
Office Action issued for U.S. Appl. No. 14/031,846, dated Aug. 31, 2017, 17 pages.
Office Action issued for U.S. Appl. No. 14/689,751, dated Oct. 6, 2017, 14 pages.
Extended European Search Report issued for European Patent Application No. 17195907.5, dated Dec. 4, 2017, 7 pages.
Office Action issued for U.S. Appl. No. 14/031,846, dated Dec. 19, 2017, 18 pages.
Office Action issued for U.S. Appl. No. 14/689,751, dated Jan. 25, 2018, 18 pages.
Office Action issued for Canadian Patent Application No. 2,881,812, dated Jan. 30, 2018, 5 pages.
Summons to Attend Oral Proceedings issued for European Patent Application No. 13829187.7, mailed Feb. 2, 2018, 8 pages.
Office Action issued for U.S. Appl. No. 15/729,719, dated Nov. 20, 2018, 12 pages.
Office Action issued for U.S. Appl. No. 15/423,026, dated Nov. 13, 2018, 10 pages.
Notice of Allowance issued for U.S. Appl. No. 15/423,026, dated Apr. 29, 2019, 9 pages.
Notice of Allowance issued for U.S. Appl. No. 15/729,719, dated May 20, 2019, 9 pages.
Notice of Allowance issued for U.S. Appl. No. 16/522,447, dated Feb. 6, 2020, 11 pages.

\* cited by examiner

SYSTEM, METHOD AND COMPUTER PROGRAM FOR IMPROVED FORECASTING RESIDUAL VALUES OF A DURABLE GOOD OVER TIME

CROSS-REFERENCE TO RELATED APPLICATIONS

This application is a continuation of, and claims a benefit of priority under 35 U.S.C. § 120 of the filing date of U.S. patent application Ser. No. 15/729,719, filed Oct. 11, 2017, now U.S. Pat. No. 10,430,814, entitled "SYSTEM, METHOD AND COMPUTER PROGRAM FOR IMPROVED FORECASTING RESIDUAL VALUES OF A DURABLE GOOD OVER TIME," which claims a benefit of priority from U.S. Provisional Application No. 62/406,786, filed Oct. 11, 2016, entitled "SYSTEM, METHOD AND COMPUTER PROGRAM FOR IMPROVED FORECASTING RESIDUAL VALUES OF A DURABLE GOOD OVER TIME," and which is a continuation-in-part of U.S. patent application Ser. No. 15/423,026, filed Feb. 2, 2017, now U.S. Pat. No. 10,410,227, entitled "SYSTEM, METHOD AND COMPUTER PROGRAM FOR FORECASTING RESIDUAL VALUES OF A DURABLE GOOD OVER TIME," which is a continuation of U.S. patent application Ser. No. 13/967,148, filed Aug. 14, 2013, now U.S. Pat. No. 9,607,310, entitled "SYSTEM, METHOD AND COMPUTER PROGRAM FOR FORECASTING RESIDUAL VALUES OF A DURABLE GOOD OVER TIME," which claims a benefit of priority from U.S. Provisional Application No. 61/683,552, filed Aug. 15, 2012, entitled "SYSTEM, METHOD AND COMPUTER PROGRAM FOR FORECASTING RESIDUAL VALUES OF A DURABLE GOOD OVER TIME." All applications listed in this paragraph are hereby fully incorporated by reference herein for all purposes.

TECHNICAL FIELD

This disclosure relates generally to forecasting future market value of durable goods, and more particularly to improved systems, methods and computer program products for forecasting the value of an item using microeconomic, macroeconomic, and competitive set information and updating the forecast value at predetermined time intervals.

BACKGROUND OF THE RELATED ART

The market value of an item is known at the time that it is sold to a consumer. After this initial transaction, however, the value of the item will decline. The amount by which the value decreases may depend upon many factors, such as the amount of time that has passed since the original sale, the amount of wear experienced by the item, and so on.

Because of the difficulty of determining these factors with any certainty, the value of an item after its initial sale is conventionally determined by resale values of the item. For instance, the value of a two-year-old automobile is determined by examining the prices for which similarly equipped automobiles of the same make, model and year have actually sold. While some adjustments may be made to these values (e.g., for vehicle mileage above or below some average range), determination of the automobile's value generally relies on past resale prices of the same vehicle.

Since these conventional methods of determining the value of an item are relatively simplistic and take into account only backward-looking data (e.g., past sales of the item), they are not as accurate as may be desired. For instance, an automobile leasing company may need to know the future value of the automobiles that it owns in order to obtain financing for expansion or other business transactions. It would therefore be desirable to provide improved methods for determining the future value of such items.

SUMMARY OF THE DISCLOSURE

This disclosure is directed to new and improved systems, methods and computer program products for forecasting future values of an item that solve one or more of the problems discussed above. An object of the invention is to provide realistic and adjusted residual values of a durable good (item) over the item's lifecycle to reflect the market, incentives and purchases. Another object of the invention is to provide accurate, reliable residual values across items being valued such that manufacturers can market their items with clear, consistent messages based on accurate, reliable forecasts. Yet another object of the invention is to provide relevant and timely residual values that reflect product enhancements, packaging, and/or content adjustments made to items being valued. Yet another object of the invention is to provide residual values that have utility to each manufacturer's ecosystem. Such residual values may encompass all phases of a durable good sales cycle, for instance, from dealer engagement, manufacturer support, cooperation on pricing, to off-lease supply management.

These and other objects of the invention may be realized in a residual value forecasting system embodied on one or more server machines particularly configured for generating forecasted future values (residual values) of an item, for instance, a high-value durable good such as a vehicle. The system may utilize various types of data received and/or obtained from disparate data sources over a network to produce variations of residual value forecasts of the item based on a new and improved residual value forecasting model. Particularly configured for agility, the system can dynamically and quickly adapt to change in data inputs and produce new outputs (referred to herein as "deliverables"), such as a blended or customized forecast, to client devices. In addition to agility, the new and improved residual value forecasting model disclosed herein can also change how deliverables are produced by implementing a significantly more sophisticated residual value forecasting algorithm.

In some embodiments, a residual value forecasting method implementing a special residual value forecasting algorithm may include receiving, by a system implementing the method and operating in a network computing environment, a request from a client device for a residual value forecast of an item. For the purpose of illustration, and not of limitation, the item can be a vehicle or any high-value durable good that does not wear out quickly or that yields utility over time. Responsively, the system may determine a baseline value for the vehicle, based on a given configuration of the vehicle, and determine a reference period at which adjustments to the baseline value may be made. The reference period may begin at an initial time and ends a period of time from the initial time ("referred to as the forecast time"). The initial time may be the day of the request or a day in the past. The period of time may be a number of months such as 24-month, 36-month, etc.

The residual value forecasting method may further comprise determining locality adjustment(s) to the vehicle; collecting or estimating incremental values of modifications to the base configuration of the vehicle; determining a locality-adjusted value of the modified vehicle; constructing competitive sets of similar and/or substitute vehicles in the same industry, for instance, the used vehicle industry; collecting macroeconomic data and determining a macroeconomic factor based on the collected macroeconomic data; collecting microeconomic data and determining a microeconomic factor based on the collected microeconomic data; and generating a forecast residual value of the vehicle at the forecast time, given the macroeconomic factor and the microeconomic factor relative to the locality-adjusted value of the modified vehicle and in view of the competitive sets of similar and/or substitute vehicles in the same industry.

In some embodiments, the residual value forecasting method may further comprise performing at least a quality assurance process. The quality assurance process may entail comparing the forecast residual value of the vehicle with residual values of vehicles in the competitive sets, computing adjustments accordingly, and generating a final residual value for the vehicle.

In some embodiments, the residual value forecasting method may leverage linear regression modeling techniques to provide purely data science driven outputs with high R-squared values, for instance, at least approximately 80% to 85%. Skilled artisans appreciate that linear regression calculates an equation that minimizes the distance between a fitted line and all of the data points. R-squared is a statistical measure of how close the data are to the fitted regression line. In the context of this disclosure, this statistical measure provides quantitative evidence in how the new and improved residual value forecasting model can alone explain a significantly higher percentage of the variance in the dependent variable, without user intervention, oversight processing, or any qualitative feedback cycle (referred to herein as "qualitative input") to the model output. As skilled artisans can appreciate, high reliance on qualitative input can affect accuracy of values in a negative way based on processing inefficiencies.

The significant reduction of non-efficient qualitative input enables a system implementing the residual value forecasting method disclosed herein to perform significantly more efficiently and reduce processing times and resources such as computer systems used. The system may optionally allow efficient qualitative input, if desired. Efficient qualitative input may be much more dedicated to non-processing matters such as efficient quality assurance (QA) of the output. This focus, in turn, can result in producing more accurate and higher quality output.

One embodiment may comprise a system having a processor and a memory and configured to implement a method disclosed herein. One embodiment may comprise a computer program product that comprises a non-transitory computer-readable storage medium which stores computer instructions that are executable by at least one processor to perform the method. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

Other objects and advantages of the invention may become apparent upon reading the following detailed description and upon reference to the accompanying drawings.

DETAILED DESCRIPTION OF EXEMPLARY EMBODIMENTS

Embodiments of the invention and various features and advantageous details thereof are explained more fully with reference to the non-limiting embodiments that are representatively illustrated in the accompanying drawings and detailed in the following description. Descriptions of well-known starting materials, processing techniques, components and equipment are omitted so as not to unnecessarily obscure the invention in detail. It should be understood, however, that the detailed description and specific examples, while indicating exemplary and representative embodiments of the invention, are given by way of illustration only and not by way of limitation. Various substitutions, modifications, additions or rearrangements are within the spirit or scope of this disclosure and will become apparent to those skilled in the art from this disclosure.

For the purposes of this disclosure, the term "item" may be used to refer to a durable good, product, or any item that has a known value at the time it was first sold and that has a different resale value over time thereafter. Examples of an item may include a vehicle, a real estate property, etc.

The resale value of an item may be affected by various factors such as time, the availability of same or similar items, the geographical location where the item physically resides, demand in for the item in the resale market and/or industry, the purchasing power of the target buyers, and so on. An ability to determine the amount by which the item will change (e.g., devalue) over time, and thereby forecast the resale or residual value of the item can provide a better understanding of a company's assets and can allow the company to make better decisions.

Figure 1:
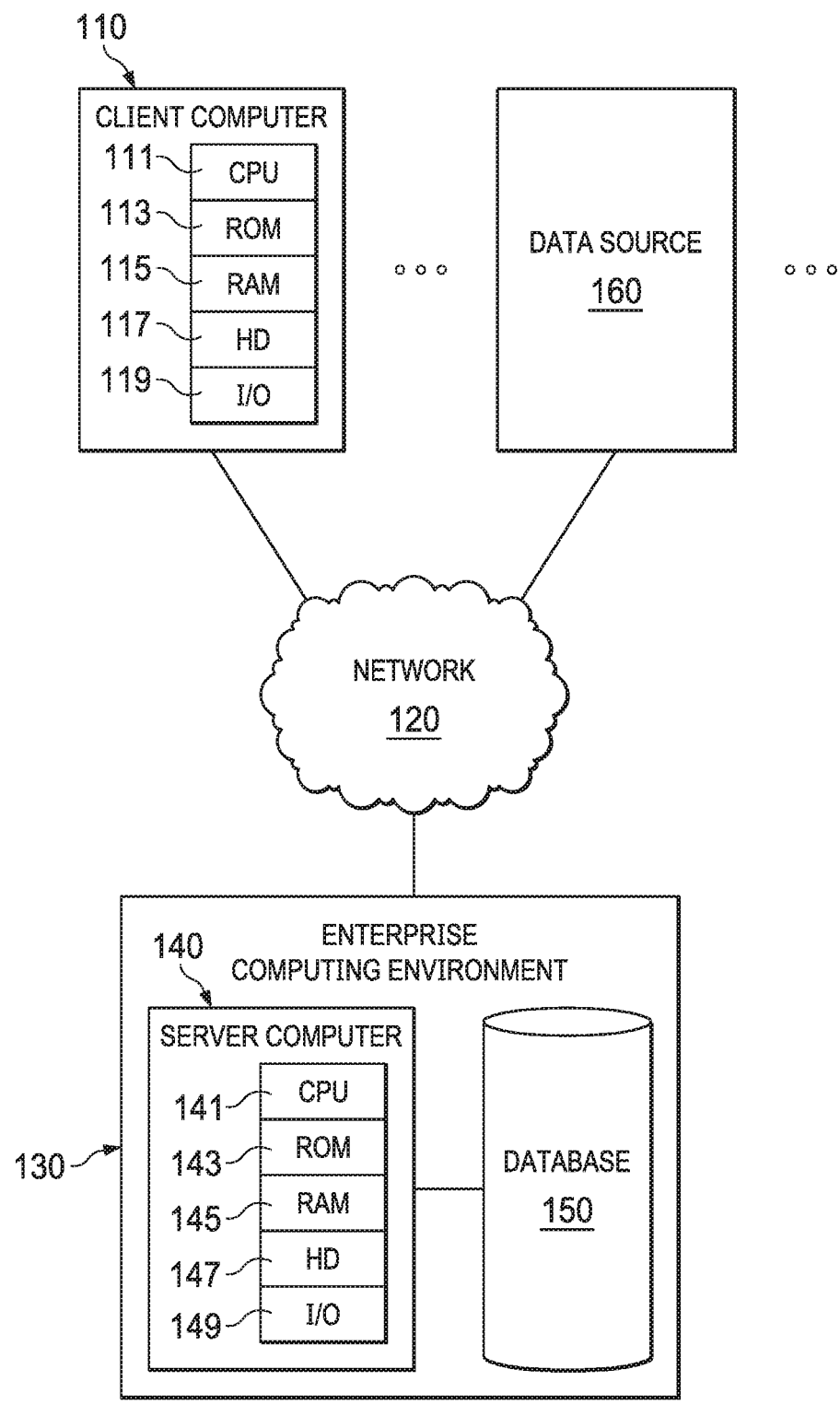
FIG. 1 depicts a diagrammatic representation of an example of system architecture, according to some embodiments disclosed herein.

FIG. 1 depicts a diagrammatic representation of an example of system architecture, according to some embodiments disclosed herein. For purposes of clarity, a single client computer 110, a single server computer 140, and a single data source 160 are shown in the example of FIG. 1. Client and server computers 110, 140, and data source 160 each represents an exemplary hardware configuration of a data processing system capable of bi-directionally communicating with other networked systems and devices over a network such as the Internet. Those skilled in the art will appreciate that enterprise computing environment 130 may comprise multiple server computers, and multiple client computers and data sources may be bi-directionally coupled to enterprise computing environment 130 over network 120.

Client computer 110 can include central processing unit ("CPU") 111, read-only memory ("ROM") 113, random access memory ("RAM") 115, hard drive ("HD") or storage memory 117, and input/output device(s) ("I/O") 119. I/O 119 can include a keyboard, monitor, printer, and/or electronic pointing device. Example of I/O 119 may include mouse, trackball, stylist, or the like. Client computer 110 can include a desktop computer, a laptop computer, a personal digital assistant, a cellular phone, or nearly any device capable of communicating over a network. Server computer 140 may have similar hardware components including CPU 141, ROM 143, RAM 145, HD 147, and I/O 149. Data source 160 may include a server computer having hardware components similar to those of client computer 110 and server computer 140, or it may be a network-enabled data storage device.

Each computer shown in FIG. 1 is an example of a data processing system. ROM 113 and 143, RAM 115 and 145, HD 117 and 147, and database 150 can include media that can be read by CPU 111 and/or 141. Therefore, these types of computer memories exemplify non-transitory computer-readable storage media. These memories may be internal and/or external to computers 110 and/or 140.

Portions of the methods described herein may be implemented in suitable software code that may reside within ROM 143, RAM 145, HD 147, database 150, or a combination thereof. In some embodiments, computer instructions implementing an embodiment disclosed herein may be stored on a direct access storage device (DASD) array, magnetic tape, floppy diskette, optical storage device, or any appropriate non-transitory computer-readable storage medium or storage device. A computer program product implementing an embodiment disclosed herein may therefore comprise one or more computer-readable storage media storing computer instructions translatable by CPU 141 to perform an embodiment of a method disclosed herein.

In an illustrative embodiment, the computer instructions may be lines of compiled C++, Java, or other language code. Other architectures may be used. For example, the functions of server computer 140 may be distributed and performed by multiple computers in enterprise computing environment 130. Accordingly, each of the computer-readable storage media storing computer instructions implementing an embodiment disclosed herein may reside on or accessible by one or more computers in enterprise computing environment 130.

Figure 2:
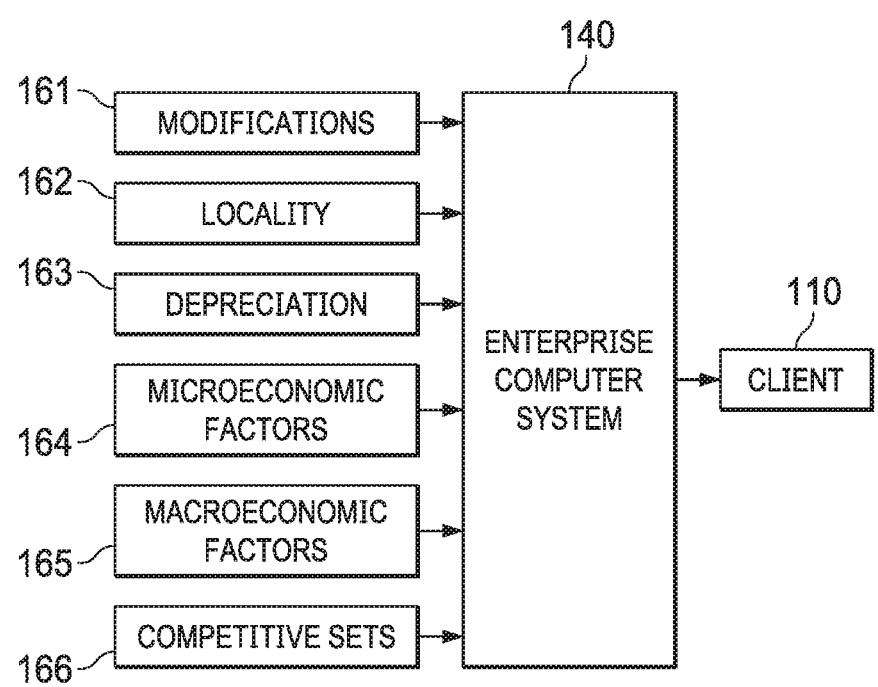
FIG. 2 depicts a diagrammatic representation of an example of various types of data collected by an example of an enterprise computer system in which embodiments disclosed herein may be implemented.

FIG. 2 depicts a diagrammatic representation of an example of various types of data collected by an example of enterprise computer system 140 in which embodiments disclosed herein may be implemented. In this example, enterprise computer system 140, which may be embodied on one or more server machines operating in enterprise computing environment 130, may receive, obtain, or otherwise collect various types of data 161-166. Before describing these data types in detail, an overview of residual value forecasting methodology may be helpful.

The current market value of a durable good ("item") is known at the time of sale, $t_0$, but its resale value at some future time points, $t_n > t_0$, may be largely unknown. In this disclosure, a forecast of such a resale value can be generated by computing a special function with estimated coefficients.

An ability to forecast the resale—or "residual"—value of item provides a better understanding of the amount by which the item will devalue over fixed interval of time. If the aim is to determine the amount of devaluation of an item that will occur between time period m and n ($\Delta_{(n,m)} = t_n - t_m$), one must compute:

$$\Delta V_{i(n,m)} = V_{i,n} - V_{i,m} \qquad \text{[Equation 1]}$$

where $V_{i,m}$=the value of item i at time $t_m$ $V_{i,n}$=the value of item i at time $t_n$.

Figure 8:
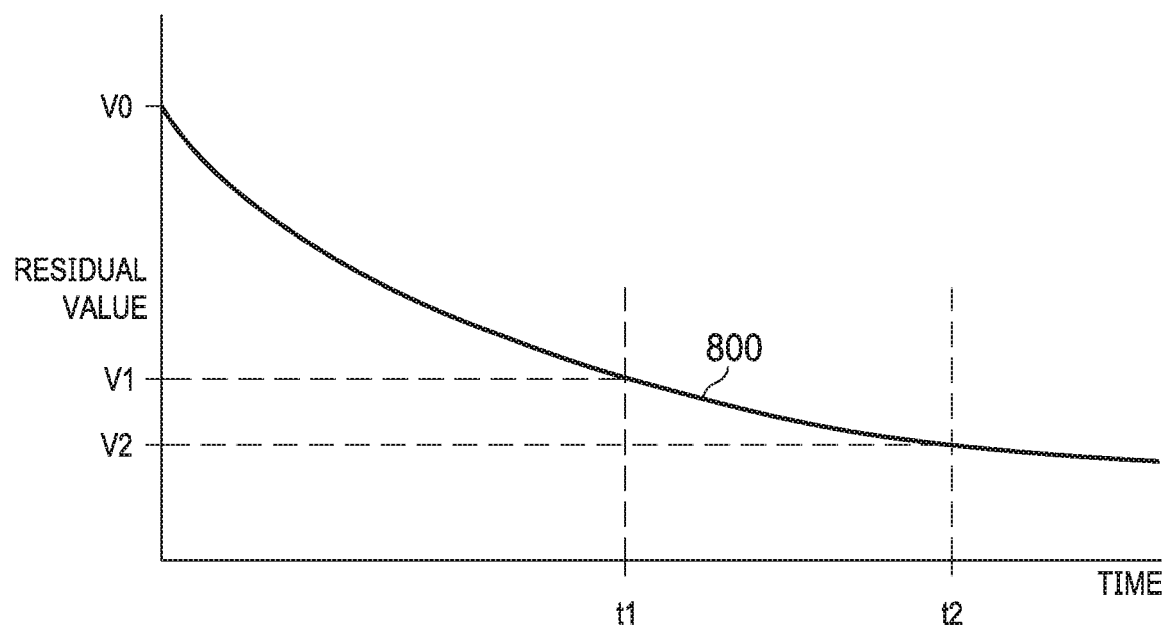
FIG. 8 depicts a plot diagram illustrating an example of a residual value curve, according to some embodiments disclosed herein.

Though the change in valuation between any single time point and a future time point requires that $\Delta_{(n,m)} = (t_n - t_m)$ be greater than or equal to 0, there is no restriction on the algebraic sign of the change in value during that time period as an item may increase in value as time elapses. Briefly referring to FIG. 8, the market value of item i in the current period, $t_0$, is $V_{i,0}$ but continually declines over time. After a period $\Delta_{(n,m)} = (t_1 - t_0)$, the change in value of item i is $\Delta V_{i,(n,m)} = V_{i,1} - V_{1,0} < 0$. The change in value between $\Delta_{(n,m)} = (t_2 - t_0)$ is $\Delta V_{i,(n,m)} = V_{i,2} - V_{i,0} < 0$ and the change in value between $\Delta_{(n,m)} = (t_2 - t_1)$ is $\Delta V_{i,(n,m)} = V_{i,2} - V_{i,1} < 0$. Though the devaluation over time requires that $\Delta_{(n,m)} = (t_n - t_m)$ be greater than or equal to 0, there is no restriction on the algebraic sign of the change in value during that time period as an item may increase in value as time elapses.

A major complication that arises in determining the residual value of an item at a future time point, $V_{i,n}$, will not actually be known until $t_n$. This complication suggests that some type of forecasting must be conducted in order to estimate residual values in time periods that have not yet been reached. This disclosure provides a methodology for forecasting residual values in two time periods, $t_m$ and $t_n$, and enables the construction of a change in valuation metric $\Delta V_{i(n,m)}$. By estimating the changes in value for successive future time intervals, one can then construct a function that captures the estimated relationship between time and the item's value. In this approach, a residual value forecasting model is built to predict $V_{i,n}$ for any time period $0 \leq n \leq T$. As forecast interval is relative to the baseline, $\Delta_{(n,0)}=(t_n-t_0)$, the farther away in time a forecast is relative to the baseline, the more uncertainty will exist. Accordingly, the forecasting error $\varepsilon_{n,0}$ will grow as the width of the time interval, 66 $_{(n,0)}$, increases.

Taking this uncertainty into consideration, embodiments utilize different types of data to aid in forecasting residual values of an item over time. Example data types include, but are not limited to, modifications to the items, locality of the items, microeconomic factors, macroeconomic factors, and sets of competitive items. Special variables representing these data types will be discussed in more detail below.

Modifications 161 reflect any changes to item i that may affect its value at any time point. Examples of modifications ($M_i$) include options added to the item in prior periods, different configurations/styles of the item, or other features which may distinguish one item from another that is produced by the same manufacturer.

Locality 162 represents valuation differences of item i in an industry (p), the valuation differences varying geographically ($i \in p$). Examples of Locality ($L_p$) would include adjustments to equalize sales of the essentially identical items made in different locations, allowing valuation to be conducted, for instance, at both the national and state/province levels.

Depreciation 163 represents the natural change in value that occurs as item i is used over time. Depreciation ($D_i$) can be determined from past sales of the item. Some embodiments of a residual value forecasting method may not need to rely on $D_i$ in generating a residual value forecast.

Microeconomic 164 represents information specific to the industry p to which item i is associated ($i \in p$). For example, microeconomic factors ($G_p$) may include supply and/or demand specific to the industry p, industry trends, seasonality, and/or volatility of the item, or information about a company that is in the industry p. For example, segment supply and model supply are specific to the automotive industry and thus are considered microeconomic factors specific to the automotive industry. In contrast, the overall industry supply is considered a macroeconomic impact factor as it affects the overall automotive economy.

Macroeconomic 165 represents information that is non-specific to the item and/or its industry. Macroeconomic factors (F) may relate to the overall economy, rather than to the specific industry with which item i is associated (e.g., the real estate or automotive industries). Examples of macroeconomic information may include gas prices, inflation, unemployment rate, interest rates, industry-wide used market supply, etc. All vehicles (e.g., fleet vehicles, lease/loan financed vehicles, cash paid vehicles) are generally expected to return to the used market (e.g., used vehicles offered at dealers, used vehicles transacted from private parties to private parties, etc.) in a given period of time with certain ages (e.g., 1-5 year-old vehicles). As an example, when a new car is leased, at some point in time that vehicle is expected to be returned to a bank after the lease is up and the returned vehicle most likely will be offered in the used market for sale by a dealer. Such items or units in the overall industry-wide used market supply can be in the millions. For example, over 11 million units of vehicles ages 1-5 years can be expected to return every year to the used market.

Competitive sets 166 represent information that relates to items that compete with the item of interest. Competitive sets ($C_{iU}$) include all other items, $j=1, \ldots, J$ ($i \neq j$), in the same industry p and in the competitive set U ($i, j \in U \; \forall \; j$) which are similar and/or are reasonable substitutes for item i being valued. Examples of competitive items j may include items produced by different manufacturers that share similarities (e.g., similar vehicle attributes such as miles per gallon, engine type, transmission type, sports package, weather package, technology package, etc.) with item i being valued. Competitive sets 166 may also include information relating to sales incentives applied to competitive items j. Competitive sets 166 may further include information relating to sales or recall information for competing items.

Leveraging these particular data types, the new and improved residual value forecasting model described below can be applied to any durable good—that is, items not immediately consumed and retaining some non-negative value over time. In some embodiments, model variable representing the particular data types described above may encompass the various components of the residual value forecasting model required to value item i in any industry p. Specifically, the microeconomic ($G_p$), Locality ($L_p$), and competitive sets ($C_{iU}$) components are specific to an industry p pertaining to item i that is being valued as long as all other members, $j=1, \ldots, J$, of the competitive set U are in the same industry, p, as item i.

A system implementing the new and improved residual value forecasting model may operate to quickly adapt to different types of input data and, as such, can dynamically produce differentiating outputs (also referred to as "deliverables" or "information products") useful for various purposes such as data analyses. This useful agility and flexibility of the new system is illustrated in FIGS. 3A-3C.

Figure 3A:
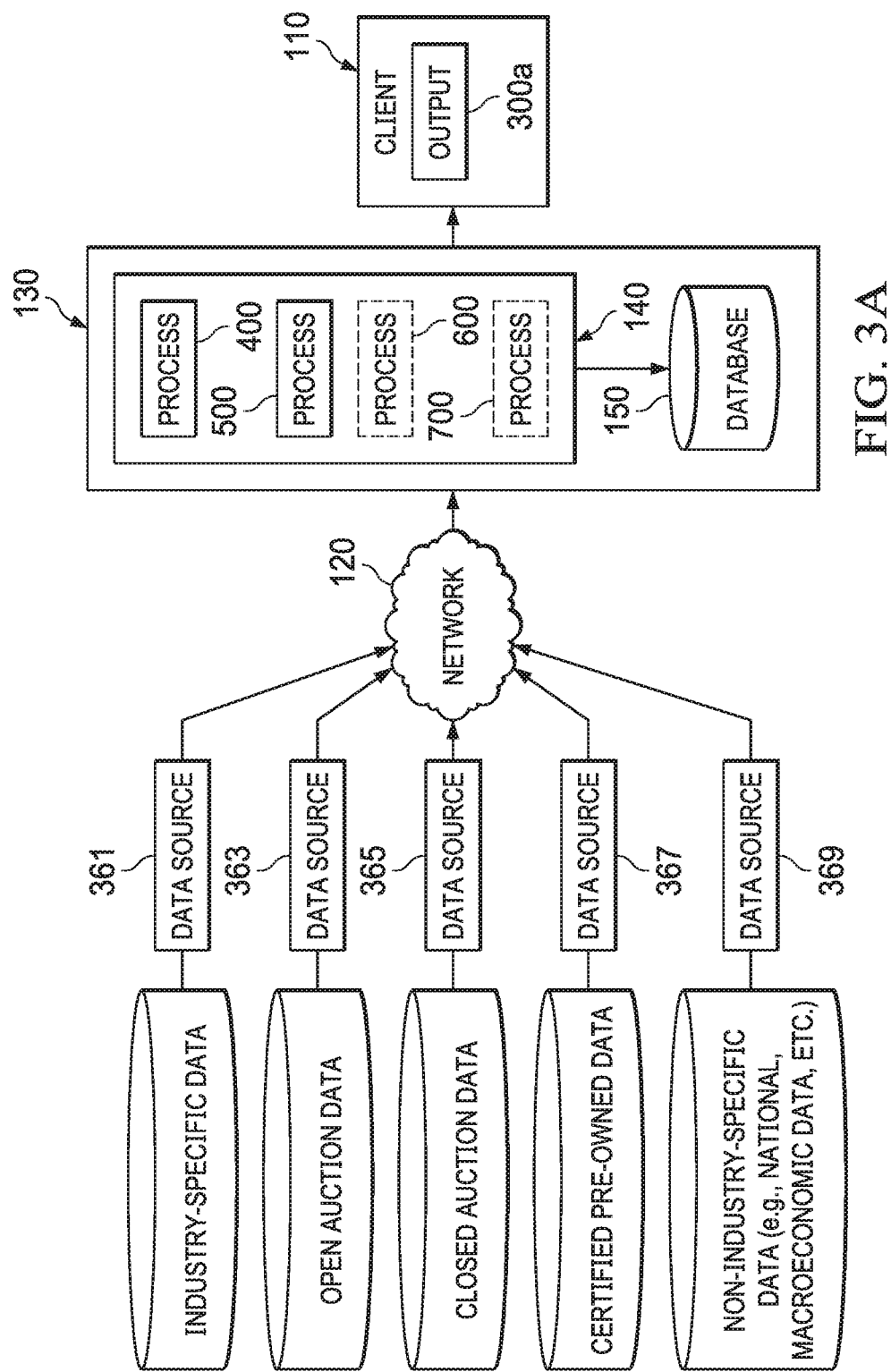
FIG. 3A depicts a diagrammatic representation of an example of a network computing environment implementing a variety of processes particularly configured for processing various types of data from disparate data sources and providing outputs to client device(s), according to some embodiments disclosed herein.

FIG. 3A depicts a diagrammatic representation of an example of a network computing environment 130 having residual value forecasting system 140 embodied on one or more server machines and implementing a variety of processes 400, 500, 600, and 700 particularly configured for processing various types of data received, obtained, or otherwise collected (simultaneously, periodically, continuously, or at different times/frequencies such as daily, weekly, monthly, quarterly, etc. over various communications channels and protocols such as File Transfer Protocol (FTP)) over network 120 from disparate data sources 361, 363, 365, 367, and 369 (which can, for instance, include a FTP server) and providing outputs 300b to client device(s) 110, according to some embodiments disclosed herein. Processes 400, 500, 600, and 700 are described in detail below. In some embodiments, raw data from disparate data sources 361, 363, 365, 367, and 369 can be stored in database 150. In some embodiments, processed data from processes 400, 500, 600, and 700 can be stored in database 150.

As illustrated in FIG. 3A, examples of types of data that may be received, obtained, or otherwise collected from various data sources may include data specific to an industry relating to a particular item (referred to herein as "industry-specific data") and data not specific to any industry (referred to herein as "non-industry-specific data") such as inflation, unemployment rate, etc. Additionally, residual value forecasting system 140 may receive, obtain, or otherwise collect different types of auction data and certified data. For example, residual value forecasting system 140 may receive, obtain, or otherwise collect open auction data, closed auction data, and certified pre-own data. Skilled artisans appreciate that, although FIG. 3A shows a data source per data type, this need not be the case. A single data source may provide residual value forecasting system 140 with one or more of these data types and multiple data sources may provide residual value forecasting system 140 with the same type of data. Accordingly, FIG. 3A is meant to be illustrative and non-limiting.

Figure 3B:
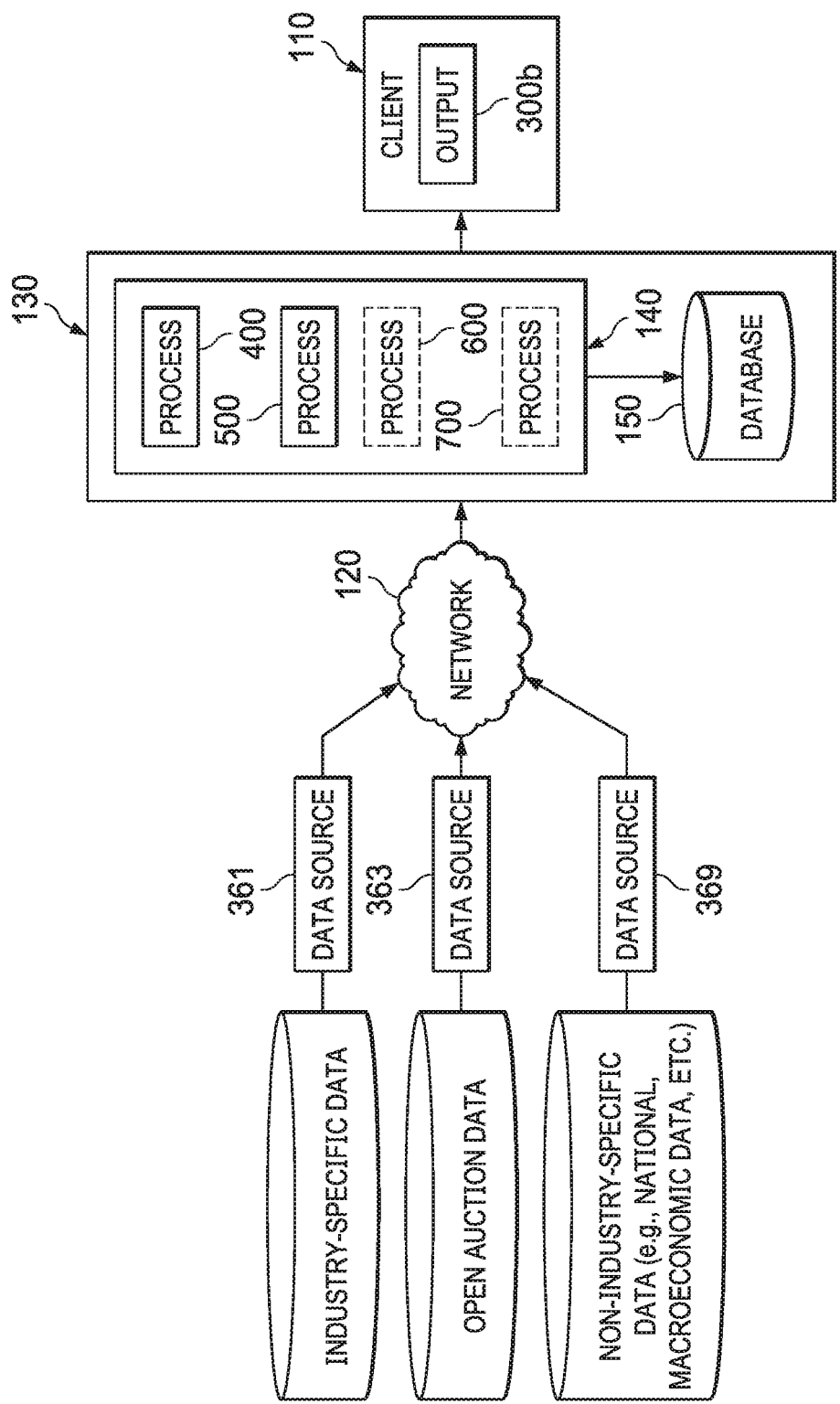
FIG. 3B depicts a diagrammatic representation of an example of a network computing environment similar to the network computing environment shown in FIG. 3A, without certain specific types of data, according to some embodiments disclosed herein.
Figure 3C:
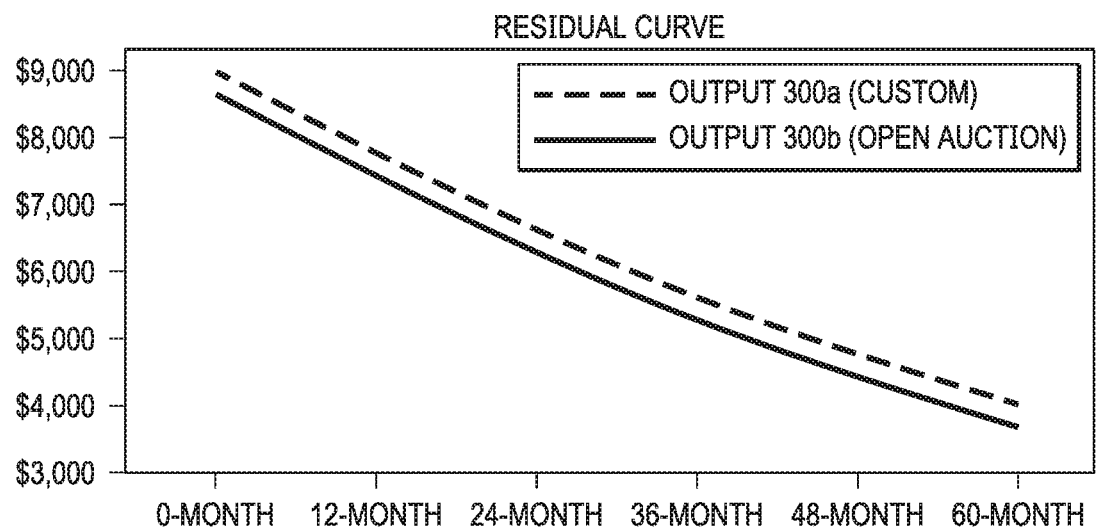
FIG. 3C depicts a plot diagram comparing two residual curves generated with (FIG. 3A) and without (FIG. 3B) certain specific types of data, according to some embodiments disclosed herein.

Similarly, FIG. 3B depicts a diagrammatic representation of residual value forecasting system 140 that receive, obtain, or otherwise collect various types of data from data sources 361, 363, and 369. In this example, residual value forecasting system 140 may consider the various types of data from data sources 361-369 in determining a residual value forecast for an item i, but may not include closed auction data and/or certified pre-owned data in its computation.

In the past, residual values of an item were calculated with significantly less heterogeneous data types than those shown in FIGS. 3A and 3B. For example, a system programmed to compute residual values for a used vehicle may rely solely on the wholesale/auction prices of used vehicles. This limits the system to rigidly producing a single type of output—residual values for a used vehicle. Embodiments of a residual value forecasting system (e.g., residual value forecasting system 140) disclosed herein is particularly programmed to operably take (and/or receive) a variety of data from disparate upstream data sources (e.g., data sources 361-369 shown in FIG. 3A or FIG. 3B, explained above), process them accordingly (explained below), and utilize them in various computations to produce information products (e.g., a custom output tailored to a customer's request, see e.g., FIG. 3C) which can have different utilities in downstream applications/scenarios. These computational processes allow the system to be agile, flexible, and robust in creating useful information products, not just for the wholesale/auction used vehicle market, but also for other industries such as the retail vehicle market, vehicle data providers, vehicle lease management, fleet management, etc. The impact of the system can be significant. For instance, a single point of residual value can have a billion dollar impact in the automotive marketplace.

FIG. 3C depicts a plot diagram comparing two residual curves generated with (e.g., FIG. 3A) and without (e.g., FIG. 3B) certain specific types of data, according to some embodiments disclosed herein. As illustrated in FIG. 3C, when residual value forecasting system 140 includes closed auction data and certified pre-owned data in addition to open auction data and other factors in determining a residual value forecast (curve) for item i over a 60-month period, custom output 300a consistently provides forecasted residual values higher than those indicated by output 300b. In some cases, one or both outputs (information products) may be presented (e.g., via a user interface) on a client device, allowing a user to utilize the output(s) to view, analyze, and/or take appropriate action such as setting a required bank reserve, as exemplified below.

Skilled artisans appreciate that there can be many useful applications of embodiments disclosed herein. For example, residual values generated by exemplary residual value forecasting system 140 disclosed herein (e.g., outputs 300a and 300b illustrated in FIG. 3C), can be used to estimate the value of automobiles over time and therefore allow one to determine the resale value that could be expected at future time points. Examples of automobiles may include nearly all passenger and light trucks available to consumers in the United States and Canada. Furthermore, the generated residual values can provide guidelines for pricing fixed-term vehicle leases which captures the expected change in value that will result in the time interval between the leased vehicle's acquisition at time to and its disposition at time $t_d$. In some embodiments, not only the estimated residual value of item i can be provided at disposition ($V_{i,d}$), but forecasted values of item i can also be provided at equally-spaced fixed time points between $t_0$ and $t_d$, thereby allowing construction of a residual curve that captures the relationship between vehicle value and time. Over time, and as new information becomes available, residual value forecasting system 140 may update the stored forecasts to reflect changing values of exogenous macroeconomic and industry-specific microeconomic variables and vehicle-specific, endogenous variables (e.g., depreciation, competitive sets, modifications, etc.).

Referring to FIGS. 4-7, examples of processes 400, 500, 600, and 700 are shown. Processes 400, 500, 600, and 700 may be implemented, for example, in residual value forecasting system 140 as shown in FIG. 1. It should be noted that the particular steps illustrated in FIGS. 4-7 are exemplary, and the steps of alternative embodiments may vary from those shown in FIGS. 4-7.

Figure 4:
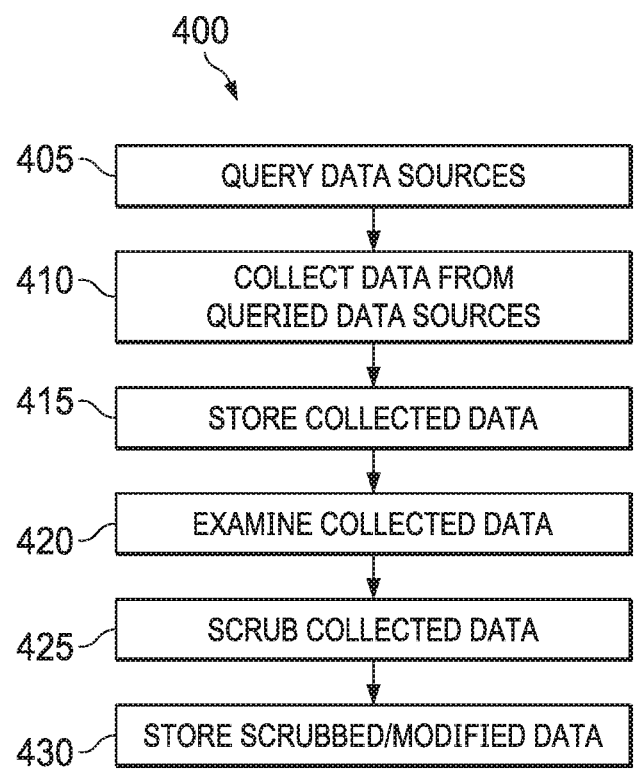
FIG. 4 is a process flow illustrating the acquisition of various types of data from disparate data sources and preparation of input data for a residual value forecasting method, according to some embodiments disclosed herein.

Referring to FIG. 4, process flow 400 illustrates the acquisition of various types of data from disparate data sources and preparation of input data for a residual value forecasting method (e.g., process 500 shown in FIG. 5, described below), according to some embodiments disclosed herein. In some embodiments, process 400 may be part of a residual value forecasting system embodied on one or more server computer (e.g., enterprise computer system 140) operating in an enterprise computing environment (e.g., enterprise computing environment 130) and specially programmed to implement a residual value forecasting method disclosed.

The residual value forecasting system may initially query data source(s) for information of various types described above (405). The data sources may include those (e.g., data storage units) that are internal to the enterprise computing environment and those that are external to the enterprise computing environment. In one embodiment, the residual value forecasting system may employ data crawlers that are particularly programmed to programmatically and automatically (e.g., periodically or continuously) query external data sources, including those operating in disparate network computing environments and conditions, searching for information relevant to generating a certain forecast, for instance, responsive to a request for a custom forecast from a client device communicatively connected to the residual value forecasting system over a network. The request from the client device may include information on a particular vehicle Year/Make/Model/Type and a specified time period. Optionally, the request may indicate a desired data type or data types to be used in generating the forecast. Alternatively or additionally, the residual value forecasting system may systematically and automatically generate various forecasts estimating the values of different vehicle Years/Makes/Models/Types over different time periods and lengths and may push the various forecasts thus generated to different client devices (which can be owned and operated by different entities/owners). Optionally, a registered user (e.g., a subscriber) who has an account with the residual value forecasting system may log in remotely to search and/or review a particular forecast or forecasts generated by the residual value forecasting system.

The residual value forecasting system may receive, obtain, or otherwise collect the data from these data sources (410) and store the collected data for further processing (415). The collected data is examined by the residual value forecasting system (420) and processed to identify portions of the data that will be used to generate the forecast.

The data may be "scrubbed" by the residual value forecasting system (425) in order to provide a better basis for the forecast. The scrubbing process may involve the residual value forecasting system performing various techniques to improve the quality of the data, such as identifying data that appears to be in error, removing outlying data points that substantially deviate from the remainder of the data, and so on. The data may also be filtered or examined by the residual value forecasting system to identify particular fields or types of data within the data that has been collected by the residual value forecasting system.

Still further, the residual value forecasting system may transform all or part of the collected data into forms (e.g., data representations having a normalized and/or common data structure internal to the residual value forecasting system) that are suitable for use/consumption by the residual value forecasting system. Such forms can include data structures for mapping incoming vehicle data to a vehicle code system (e.g., ALG vehicle code system), cleaning up data issues (e.g., manual entry errors that exist in the incoming vehicle data), adjusting transaction prices to certain assumptions such as normalized mileage per year, etc. After the desired data has been selected and scrubbed, if necessary, the modified data set can be stored (430) in a local data storage device, from which it can be retrieved and used by the residual value forecasting system in the generation of the forecast.

Figure 5:
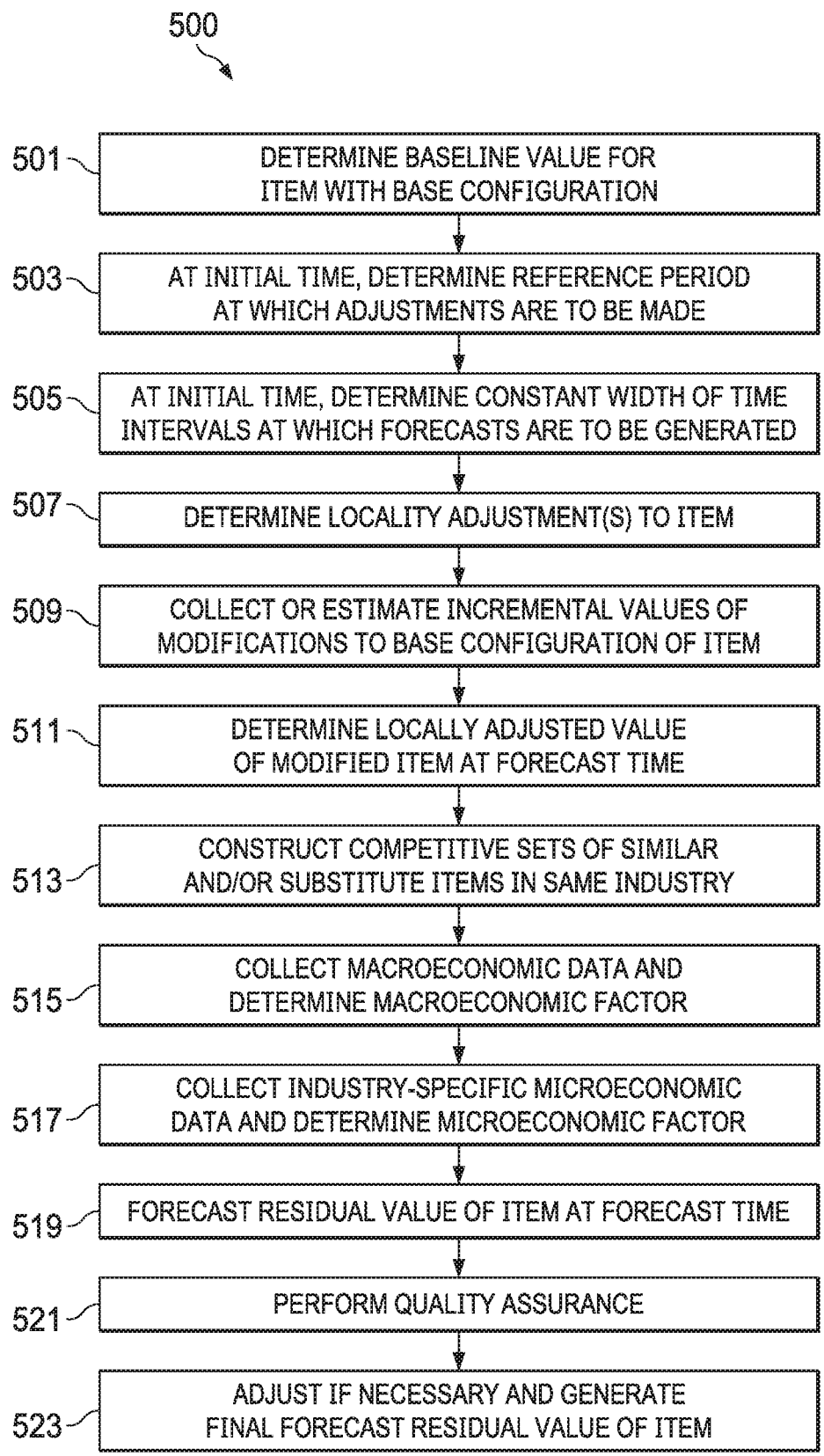
FIG. 5 is a process flow illustrating an example of a residual value forecasting method, according to some embodiments disclosed herein.

FIG. 5 is a process flow illustrating an example of residual value forecasting method 500, according to some embodiments disclosed herein. In this example, residual value forecasting method 500 may comprise determining a baseline value for an item with a base configuration (501); determining a reference period at which adjustments are to be made to the item (503); determining a constant width of time intervals at which forecasts are to be generated for the item (505); determining locality adjustment(s) to the item (507); collecting or estimating incremental values of modifications to the base configuration of the item (509); determining a locality-adjusted value of the modified item at the forecast time (511, see, e.g., FIG. 10); constructing competitive sets of similar and/or substitute items in the same industry (513); collecting macroeconomic data and determining a macroeconomic factor (515); collecting industry-specific microeconomic data and determining a microeconomic factor (517); and generating a residual value of item at the forecast time (519, see, e.g., FIG. 11). Optionally, residual value forecasting method 500 may further comprising performing one or more quality assurance (QA) operations on the generated output (521, see, e.g., FIG. 12) and adjusting, if necessary, to generate a final forecast of residual value of the item (523, see, e.g., FIG. 3C). Note that construction of the residual value forecasts requires performing some steps at certain milestones in the lifetime of the item (e.g., at $t_0$ and at any time period when any modification is made), while others may be performed at each time period for which the item's value is to be forecasted. The steps are further described in detail below.

In some embodiments, a system implementing residual value forecasting method 500 may determine a baseline value for item i with a base configuration (501), for instance, by taking an h-month historical average ($V_{i,h}$) of data points of particular data types (e.g., used market values, wholesale/auction values, etc.) collected by the system. This operation may be triggered by a request from a client device communicatively connected to the system over a network, by an instruction or command from an administrator of the system (e.g., via an administrative tool of the system), or automatically by a programmed trigger or scheduled event.

Under most circumstance, recent historical market values are available for computing $V_{i,h}$ (which represents the h-month historical average baseline value for item i with a base configuration). $V_{i,h}$ may be expressed below as a function of time, $t_n$ (n=0, . . . , T), taking a h-month historic average of the market values of item i at time $t_0$ before modifications.

$$V_{i,h} = (V_{i,0} + M_{i,n}) \times (\tau_{i,n} \times L_{p,n}) + (\beta_1 \Delta F_{n|n-h} + \beta_2 \Delta G_{p,n|n-h}) + C_{iU,n|n^*} \qquad \text{[Equation 2.1]}$$

$$V_{i,h} = BV_{i,0} + (\beta_1 \Delta F_{n|n-h} + \beta_2 \Delta G_{p,n|n-h}) + C_{iU,n|n^*} \qquad \text{[Equation 2.2]}$$

where h=1, . . . , H. As a non-limiting example, H may represent a value of 24.

Equation 2.2 represents another way to express $V_{i,h}$ where $(V_{i,0} + M_{i,n}) \times (\tau_{i,n} \times L_{p,n}) = BV_{i,0}$. These special model variables are described in more detail below.

$V_{i,0}$ represents an initial value at the beginning of the estimation period, $t_0$. $V_{i,0}$ may be obtained through direct observation of the recent market values. Once $V_{i,0}$ is known, it can be used as a baseline against which future values are computed.

$V_{i,n}$ reflects the level of the model variable for item i at period $t_n$.

$M_{i,n}$ represents incremental values of modifications to the base configuration of item i of interest.

$\tau$ (tau) represents the locality adjustment coefficient where $$\tau_{i,n} = \begin{cases} 1 & \text{if } t_n = 0 \\ 0 & \text{otherwise} \end{cases} \qquad \text{[Equation 3]}$$

For example, $\tau=1$ if t=0 (meaning for used values being observed currently) where $BV_{i,0}(V_{i,0} + M_{i,n}) \times (\tau_{i,n} \times L_{p,n})$ represents recent market values vary by region ($\tau=1$). In embodiments that do not forecast regional values, no locality adjustment is made ($\tau=0$) for future values (forecast) if t>0.

$L_{p,n}$ reflects the locality adjustment $L_p$ made at time $t_n$ to all items in industry p (i ∈ p).

$\Delta F_{.,n|n-h}$ reflects the change in the macroeconomic (neither industry-specific nor item-specific) variable $t_n$-$t_0$, given the historical information about that variable in the last h=1, . . . , H periods ($t_{n-1}$, $t_{n-2}$, . . . , $t_{n-H}$).

$\Delta G_{p,n|n-h}$ reflects the change in the microeconomic variable $t_n$-$t_0$, given the historical information for industry p (i ∈ p) available about that variable in the last h=1, . . . , H periods ($t_{n-1}$, $t_{n-2}$, . . . , $t_{n-H}$).

$\beta_1$ reflects the set of the coefficient(s) of the macroeconomic (neither industry-specific nor item-specific) variable, given the historical information about that variable in the last h=1, . . . , H periods ($t_{n-1}$, $t_{n-2}$, . . . , $t_{n-H}$), $\beta_2$ reflects the set of the coefficient(s) of the microeconomic variable, given the historical information for industry p (i ∈ p) available about that variable in the last h=1, . . . , H periods ($t_{n-1}$, $t_{n-2}$, . . . , $t_{n-H}$), $C_{iU,n|n^*}$ reflects a competitive set adjustment made to item i based at time period $t_{n^*}$ based on an observed discrepancy between $V_{i,n}$ and the predicted values of all other items, j=1, . . . , J (i≠j) in the competitive set U (i, j ∈ U ∀ j) evaluated at some reference period, $t_n$.

$BV_{i,0}$ represents the baseline value of item i at t=0, adjusted for modifications $M_{i,n}$ and locality $L_{p,n}$.

The output ($V_{i,h}$) of Equation 2.1 or 2.2 represents an h-month historical average current market value expressed in $t_{0-n}$ months historical average, reflecting the market information across all localities, Z, in which item i is available.

If a baseline value cannot be determined or obtained directly for item i, the system may construct K competitive sets, $U_k$, of similar and/or substitute items in the same industry and select the most similar item j (i≠j) as a substitute (see Equation 6) and use its value.

If the substitute item j's value was constructed in a time period before $t_0$, the system may escalate the value based on inflation values for industry p in which items i and j are assigned.

As discussed above, the farther away in time a forecast is relative to the baseline value, the more uncertainty will exist and the more forecasting error $\varepsilon_{n,0}$ may exist. This seemingly unavoidable nature of forecasting future residual values can be highly undesirable, if not detrimental, to certain entities that rely on knowledge of the future residual values to make important decisions, sometimes with severe consequences, if the forecasted residual values are less than accurate. For example, knowledge of the future residual values may be useful to some entities some entities in setting leasing rates which reflect the expected change in valuation between the beginning and ends of a fixed lease period. As another example, knowledge of the future residual values may be useful to some entities in determining the amount at which an item can be resold at any time period—a useful metric that can be used in investment decisions such as real estate. As yet another example, knowledge of the future residual values may be useful to some entities in providing information supporting the strategic planning decisions made of the manufacturer of item i.

Furthermore, knowledge of the future residual values may be useful in understanding and determining whether the change in value will be constant over time intervals of the same length. For example, returning briefly to FIG. 8, the change ($\Delta V_{i,(1,0)}$) between $V_i$ at $t_0$ (represented by V0 in FIG. 8) and $V_i$ at $t_1$ (represented by V1 in FIG. 8) is larger than the change ($\Delta V_{i,(2,1)}$) between $V_i$ at $t_2$ (represented by V2 in FIG. 8) and $V_i$ at $t_1$ (represented by V1 in FIG. 8). Constant changes in valuation over all periods of equal length, $\Delta_{(n,m)} = \Delta_{(m,p)}$ (m≠p) would result in a function between time and value represented by a straight line (increasing, decreasing or flat) while non-constant changes would be represented by a non-linear function.

To understand the relationship between residual values and time, embodiments employ both historical and current data. For example, if there is an underlying monthly seasonality in the residual values over time, it would take a few years of historical data to be able to detect, measure, or estimate the amount of seasonal variation. Additionally, it would be difficult to forecast residual values for an interval $\Delta_{(n,m)}$ if the historical data used to construct the forecasting model has a length $\Delta < \Delta_{(n,m)}$. An additional data constraint results from the frequency at which the data used to construct the model (e.g., macroeconomic, microeconomic, competitive sets, etc.) is updated. If each of r=1, . . . , R input variables (not to be confused with the Q and R notations explained below) has an update frequency of $\varphi_r$, then the frequency at which the residual forecasts can be updates is $$\varphi^* = \min_r(\varphi_r).$$

The knowledge of whether a residual value curve is linear or non-linear may be deterministic as to how the effect of potential time degradation is handled. For example, although the first observation (the time period when item i first becomes available on the market) is indexed at $t_0$, in some cases, a user of the residual forecast relationship may be interested in using a later time period, $t_s \geq t_0$, as a starting point from which changes in valuation are assessed—for instance, if item i will not be purchased until $t_s$ and will remain in the seller's inventory until then. The anchor point for the curve remains fixed at $t_0$, but the evaluation of the curve shift from $\Delta_{(n,0)}$ to $\Delta_{(n+s,s)}$ (on the horizontal axis) and from $\Delta V_{i,h}$ to $\Delta V_{i,(n+s,s)}$ (on the vertical axis). If the residual value curve was linear, the shifting of the time evaluation window by s periods would have no impact on the value change. However, in the cases where the residual value curve is non-linear, the appropriate time starting point should be chosen to account for the time degradation effect that occurs as item i remains in its original state.

Although the baseline value ($V_{i,h}$) of item i is known and remains unchanged, the forecast of residual value of item i needn't also remain fixed over time. As new information becomes available that is reflected in the variable types discussed above (e.g., variables in Equation 2.1 or 2.2 representing data types 161-166), it is possible to employ that additional information to update the forecasted residual value of item i.

Accordingly, in some embodiments, the system may operate to determine, at time $t_n=0$, a reference period, $t_n^*$, at which adjustments are to be made to item i to align the baseline value of item i with values of other items in a competitive set of similar and substitute items in the same industry p as item i (503).

The reference period, $t_n^*$, may be determined in consideration of the following constraints:

The minimum frequency in which the input data is updated. If each of r=1, . . . , R input variables has an update frequency of $\varphi_r$, then the frequency at which the residual forecasts can be updated is $$\varphi^* = \min_r(\varphi_r).$$

The value of $t_n^*$ must be aligned with this frequency. For example, if the minimum frequency at which input data is updated on a monthly basis, the reference value, $t_{max}$ must correspond to month-level temporal offsets beyond $t_0$.

The expected total lifetime, $t_{max}$, of item i. If item i is not expected to retain value after period $t_{max}$, then $t_n^* \leq t_{max}$.

The utility of the outputs (residual value forecasts) from the residual value calculations. For example, if the forecasted residual values are to be used for annual corporate strategic planning, $t_n^*$ should also be based on an annual offset to $t_0$ (or as close as possible given the two previous, more binding constraints).

As an example, suppose the initial time point is Jul. 9, 2012 and input data to the model is updated on a monthly basis, the reference period could then be Jul. 9, 2012 to Aug. 9, 2012, Jul. 9, 2012 to Sept. 9, 2012, Jul. 9, 2012 to Oct. 9, 2012, etc. The reference period can be further constrained by the total expected lifetime of the item. For example, if the item is not expected to retain value after five years, then the reference period can be Jul. 9, 2012 to Jul. 9, 2017, or less (in one or more monthly temporal offsets as constrained by the update frequency of the input data to the model).

Once the reference period is determined, a number of forecasts desired between the initial time point and the reference period can be determined (505). The number of forecasts determines how often a forecast of the residual value of the item is to be generated. Starting from the initial time point, the time interval at which a forecast is to be generated can be the same as, or more than, the update frequency of the input data to the model. In some embodiments, the system may determine a constant width of time intervals, $\Delta_{(p,q)}$, at which forecasts are to be generated for item i. The selection of $\Delta_{(p,q)}$ can be determined by considering the following constraints:

It must be chosen such that $(t_n{}^*-t_0)/\Delta_{(p,q)}$ is a positive integer.

It must be greater than or equal to $$\varphi^* = \min_r(\varphi_r).$$

Following the above example in which the expected lifespan of the item is five years, if it is assumed that the reference period is two years, there can be, for example, 23 forecasts, each of which is generated at a fixed time interval of one month. If the time interval is selected to be six months, then four forecasts are generated.

With the time interval determined, the system may determine a locality adjustment ($L_p$) to item i (507). If the value of item i does not vary by geographic region (the value of item i is the same in industry p across all localities at the initial time period), then no locality adjustment needs to be made. If the base value of items in industry p to which item i is assigned varies by geographic region, the baseline value of item i at the initial time point to may be adjusted by computing a ratio between the average cost of items in the industry in a particular locality at a certain time point $t_n$ and the local cost of items in the industry across all localities at the same time point $t_n$.

In some embodiments, the system may determine locality adjustment, $L_{p,n}$, to item i as follows:

$$L_{p,n} = \frac{L'_{p,n}(z)}{L'_{p,n}(Z)} \qquad \text{[Equation 4]}$$

where $L'_{p,n}(z)$ represents the average cost of items in industry p in locality z at time $t_n$, and $L'_{p,n}(Z)$ represents the local cost of items in industry p across all localities ($z \in Z$) at time $t_n$.

As an example, consumer price index can be utilized to determine the cost information on items in various industries relative to localities. As a specific example, this ratio may be determined for items available in the United States by referring to the Consumer Price Index (CPI) provided on a monthly basis by the U.S. Bureau of Labor Statistics. As another example, Statistics Canada produces similar series for that country. Skilled artisans appreciate that many economically-developed countries have consumer price index figures that can be used to generate the locality adjustments. Note that computation of $L_{p,n}$ is normally performed at $t_0$ and when a value modification is made to account for modifications made to item i with the base configuration.

The system may collect and/or estimate incremental values of modifications, $M_{i,n}$, to the base configuration of item i (509). There can be many types of modifications. One example type can be modifications that are both observable at a particular time $t_n$ and are expected to retain some value in future time period(s) after the particular time $t_n$. Another example type can be modifications that are not observable and/or not expected to retain value after the particular time $t_n$. Equation 5 below illustrates two types of modifications:

Type A $\langle m_{i,n}{}^{(a)} \rangle$: represents modifications made to the base configuration of item i at time $t_n$ that are observable (tangible and measurable) and are expected to retain some value in future time periods after time period $t_n$, Type B $\langle m_{i,n}{}^{(b)} \rangle$: represents modifications made to the base configuration of item i at time $t_n$ that are not observable and/or not expected to retain value after a modification is made at time $t_n$.

$$M_{i,n} = \begin{cases} M_{i,n-1} + L_{p,n(z)} \times \left(m_{i,n}^{(a)} + m_{i,n}^{(b)}\right) & \text{if } t_n \neq t_0 \text{ and the modification was made in } t_n > 0 \\ \left(m_{i,n}^{(a)} + m_{i,n}^{(b)}\right) & \text{if } t_n = t_0 \text{ and the modification was made in } t_0 \\ M_{i,n-1} - \left(L_{p,n(z)} \times m_{i,n}^{(b)}\right) & \text{if } t_n \text{ period following the last Type } B \text{ last modification} \end{cases} \qquad \text{[Equation 5]}$$

Figure 10:
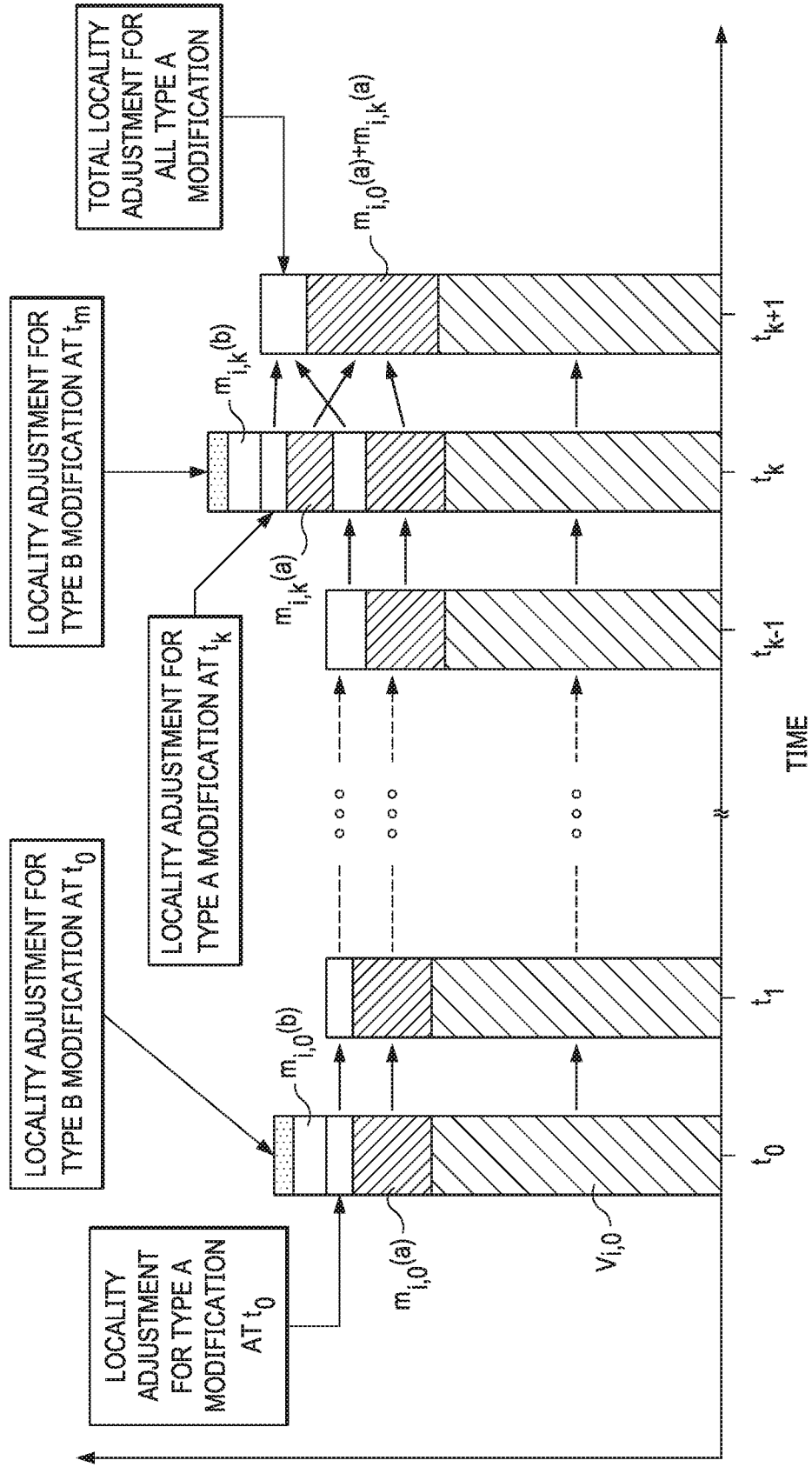
FIG. 10 depicts a bar diagram illustrating the effects of modification adjustments and locality adjustments, according to some embodiments disclosed herein.

By adjusting the base configuration's value to account for modifications, $M_{i,n}$, and locality adjustments, $L_{p,n}$, the system may determine $BV_{i,n}$ (see Equation 6)—a locality-adjusted value of item i as modified ("modified item i") at the forecast time $t_n$ (511). An example of this process is illustrated in FIG. 10, which shows the effects of modification adjustments and locality adjustments over time.

$$BV_{i,n} = (V_{i,i} + M_{i,n}) \times (\tau_n \times L_{p,n}) \qquad \text{[Equation 6]}$$

In some embodiments, the system may construct competitive sets of similar and/or substitute items in the same industry to which item i belongs (513). This construction may involve partitioning all items in the industry into k distinct clusters based on a measure of similarity between all pairs of items in the industry. A full explanation of an example competitive set approach is provided in U.S. Pat. No. 8,661,403, issued Feb. 25, 2014, entitled "SYSTEM, METHOD AND COMPUTER PROGRAM PRODUCT FOR PREDICTING ITEM PREFERENCE USING REVENUE-WEIGHTED COLLABORATIVE FILTER," which is fully incorporated herein by reference. Other competitive set approaches may also be possible.

As an example, a durable good, $x_i$, can be described by its features (1, . . . , m) (also known as characteristics or variables) as follows:

$$x_i = \{X_{i,1}, X_{i,2}, \ldots, X_{i,m}\}$$

and all N distinct goods may be represented in matrix form as $$X = \begin{bmatrix} x_{1,1} & x_{1,2} & \cdots & x_{1,m-1} & x_{1,m} \\ x_{2,1} & x_{2,2} & \cdots & x_{2,m-1} & x_{2,m} \\ \vdots & \vdots & \ddots & \vdots & \vdots \\ x_{N-1,1} & x_{N-1,2} & \cdots & x_{N-1,m-1} & x_{N-1,m} \\ x_{N,1} & x_{N,2} & \cdots & x_{N,m-1} & x_{N,m} \end{bmatrix}.$$

The similarity, $s_{ij}$, between item i and item j based on a comparison of Q observable features, can be computed using the Minkowski metric:

$$s_{ij} = 1 - [\Sigma_{q=1}^{Q} w_q |x_{i,q} - x_{j,q}|^{\lambda}]^{1/\lambda} \quad \text{[Equation 7]}$$

where $\lambda \geq 0$, $0 \leq s_{ij} \leq 1$, and $\Sigma_{q=1}^{Q} w_q = 1$. Note that although the format of the data for some options (e.g., original equipment manufacturer options, dealer-installed vehicle options, etc.) may not be numeric, similarity can still be established across features by first transforming the data to a numeric scale. Programming techniques necessary to perform such a data transformation (e.g., text mining to transform text strings to numerical fields) are known to those skilled in the art and thus are not further described herein.

At time period $t_n$, the system may compute the similarity for every pair of the N observations in the data set X, $X_i \neq X_j$, and then a N×N matrix of similarities, $S_n$. There isn't a need to compute the values of $s_{ii}$ since the similarity between an observation and itself is, by definition, 1. With a subtraction from an N×N identity matrix, the dissimilarities can be computed ($\overline{S}_n = 1 - S_n$) and used to build clusters, at time $t_n$, comprising K distinct competitive sets, $U_{k,n}$ (k=1, ..., K). Using $\overline{S}_n$, the system can employ any one of a variety of hierarchical clustering methods to partition the observations into distinct competitive sets. Examples of hierarchical clustering methods can be found in A. D. Gordon, CLASSIFICATION, 1999. When the number of observations, N, is large, the system may employ the K-means clustering method after reprojecting $\overline{S}_n$ into an Q-dimensional set of points on a scale that preserves the dissimilarities that are invariant to translation and rotation. The mechanics of the K-means clustering method below can be found in Hartigan, J. A. and Wong, M. A., "A K-means Clustering Algorithm," *Applied Statistics* 28, 1979, pp. 100-108.

1) Decide on a value for K.
2) Define K cluster centers (randomly, if necessary).
3) Decide the class memberships of the N objects by assigning them to the nearest cluster center.
4) Re-estimate the K cluster centers, by assuming the memberships found above are correct.
5) If none of the N objects changed membership in the last iteration, exit. Otherwise, go to 3).

As a specific example, if the K-means clustering method is employed, the system may partition the data into K clusters by maximizing the within-cluster variation. If a cluster is indexed by k containing $n_k$ observations, the overall within cluster variance based on a clustering outcomes is:

$$\sigma_w^2 = \sum_{k=1}^{K} \sum_{q=1}^{Q} \sum_{i=1}^{n_q} \left(x_{(k)i,q} - \overline{x}_{(k)\bullet,q}\right)^2 \quad \text{[Equation 8]}$$

And the overall variance of the clustering outcome is the sum of the within-cluster and between-cluster variances: $\sigma^2 = \sigma_w^2 + \sigma_b^2$.

Skilled artisans appreciate that a number of statistics may be utilized to decide how many clusters are to use. As a specific example, the Calinski-Harabasz index may be used:

$$\frac{\sigma_b^2/(K-1)}{\sigma_w^2/(N-K)} \quad \text{[Equation 9]}$$

At every time period, $t_n$, since the variables used to compute similarity may be time-dependent, the competitive set can be recomputed. At the end of this process, every item i, ..., I will belong to one-and-only-one of the K competitive sets, $U_{k,n}$.

To account for macroeconomic factor(s), the system may collect non-industry-specific macroeconomic data, $F_{\cdot,n|n-h}$, and either forecast future levels or incorporate existing forecasts from other sources to determine a macroeconomic factor $\hat{F}_{\cdot,n|n-h}$ (515).

Here, "F." implies that the macroeconomic factors are taken over all industries and not specific to any particular industry p. "$\hat{F}$." indicates that it is an estimated value.

The single-dimensional macroeconomic factor, $\hat{F}_{\cdot,n|n-h}$ can be represented by a linear combination of Q variables, $f_{\cdot,(n|n-h),q}$ (q=1, ..., Q), where Q represents the number of macroeconomic features under consideration, for example, housing prices, gas prices, unemployment, the Dow Jones Industrial Average, etc., and q represents one single macroeconomic feature. If the current time period is $t_m$, the information regarding future periods $t_n > t_m$, will need to be forecasted.

Additionally, the data source may be internally-derived by the organization generating the residual value forecasts (and the value of the $q^{th}$ variable at time $t_m$ is denoted $\hat{f}_{\cdot,(m|m-h),q}$). An example of an internally-derived data source is the ALG economic index shown in FIGS. 11 and 12. In this disclosure, the "ALG economic index" refers to a proprietary statistical measure of changes in a representative group of individual data points derived by ALG, Inc. of Santa Monica, Calif. The ALG economic index tracks current economic health and can be driven, for example, by three components—overall retail spending in the economy, employment ratio (e.g., how many people out of a working population are employed), and per capita gross domestic product (GDP). Alternatively, it may be from an external source such as an organization that provides economic analysis/forecasting (and the value of the $q^{th}$ variable at time $t_m$ is denoted by $\hat{f}_{\cdot,(m|m-h),q}$).

When gathering the data from multiple sources, it becomes necessary to combine them into a single value, $f_{i,m,q}$. One method for combining these values is to create a single value which gives more weight to the data source or data type in which higher confidence is held. For example, a competitive set is a collection of vehicle data (e.g., Model Year, Make, Model, Trim, etc.) which are in a particular segment (e.g., midsize sedans such as Honda Accord and Toyota Camry). A more complete data set with, for instance, good pricing information will provide higher confidence as the competitive set can more easily be determined based on, for example, reliable pricing data. For the purpose of explanation, the system may use item j and time $t_m$, where item j is used to represent a suitable substitute for item i in the same competitive set. Or, i and j may be the same item if a sufficient amount of historical data is available. The subscript m is for the time period as it may be possible that historical information required to estimate model parameters is only available from period $t_{m-h}$ to $t_m$ where $t_n \geq t_m$.

Accordingly, the combining equation at time $t_m$ for item j can be expressed as follows:

$$f_{\cdot,m,q} = \varphi_m \hat{f}_{\cdot,(m|m-h),q} + (1-\varphi_n)\hat{f}'_{\cdot,(m|m-h),q} \quad 0 \leq \varphi_m \leq 1 \quad \text{[Equation 10]}$$

where $$\varphi_m = \frac{\tau_m^2}{\tau_m^2 + \sigma_m^2}. \quad \text{[Equation 11]}$$

Here, $\tau_m^2$ represents the squared estimation error for the externally-derived variable, $\hat{f}_{\cdot,(m|m-h),q}$, and $\sigma_m^2$ represents the squared estimation error for the externally-derived variable, $\hat{f}_{\cdot,(m|m-h),q}$. After all of the variables have been collected reflecting their values from time period $t_{m-h}$ to $t_n$, the relationship between these variables and the modification/locality-adjusted base value, $BV_{j,m}$, can be expressed as a linear combination of input variables:

$$BV_{j,m}(f) = a_o + \Sigma_{q=1}^Q a_q f_{\cdot,m,q} + \varepsilon_{j,m}. \quad \text{[Equation 12]}$$

To determine the values of the Q+1 coefficients, $\alpha_0, \ldots, \alpha_Q$, the system may use the statistical method of Ordinary Least Square (OLS) regression as shown in Equation 13 below:

$$\widehat{BV}_{j,m}(f) = \hat{\alpha}_o + \Sigma_{q=1}^Q \hat{\alpha}_q f_{\cdot,m,q} \quad \text{[Equation 13]}$$

where the estimated values, $\hat{\alpha}_0, \ldots, \hat{\alpha}_Q$, are chosen such that the sum of squared errors for good j (SSEj) as shown in Equation 14 below is minimized.

$$SSE_j(f) = \Sigma_{m=0}^{h \leq n} (BV_{j,m}(f) - \widehat{BV}_{j,m}(f))^2. \quad \text{[Equation 14]}$$

The estimation of the linear coefficients, $\hat{\alpha}_0, \ldots, \hat{\alpha}_Q$, need not be computed at every period, rather the coefficients can be updated periodically, say at time $t_p$, and then used to forecast the value of $\widehat{BV}_{j,m}(f) = \hat{\alpha}_0, \ldots, \hat{\alpha}_Q$, for any time period $t_m \geq t_p$.

As the final step, once the observed or forecasted values of $f_{i,n,q}$ are determined, the macroeconomic factor for item i, $\hat{F}_{i,n|n-h}$, can be estimated as shown in Equation 15 below.

$$\hat{F}_{i,n|n-h} = \left( \frac{\hat{\alpha}_o + \sum_{q=1}^Q \hat{\alpha}_q f_{\cdot,n,q}}{BV_{i,n}} \right). \quad \text{[Equation 15]}$$

In some embodiments, the system may also collect industry-specific microeconomic data, $G_{p,n|n-h}$, for industry p in which item i being evaluated is classified and determine a microeconomic factor, $g_{p,n|n-h}$ (517). The single-dimensional microeconomic factor for item i, $\hat{G}_{i,n|n-h}$, can be represented by a linear combination of Q variables, $g_{p,(n|n-h),q}$ (q=1, ..., Q) for industry trends, industry-specific inventories/supply, industry-specific demand, etc. If the current time period is $t_m$, the information regarding future periods $t_n > t_m$, will need to be forecasted.

Additionally, the data source may be internally-derived by the organization generating the residual value forecasts (and the value of the $q^{th}$ variable at time $t_m$ is denoted $\hat{g}_{p,(m|m-h),q}$). Alternatively, it may be from an external source such as an organization that provides economic analysis/forecasting (and the value of the $q_{th}$ variable at time $t_m$ is denoted by $\hat{g}'_{p,(m|m-h),q}$). For microeconomic features and macroeconomic features, q=1, ..., Q variables have been denoted where F is the combination of variables (q=1, ... Q) for macroeconomic features, f is a single dimensional macroeconomic variable, G is the combination of all microeconomic variables (q=1, ... Q), and g is a final single dimensional microeconomic variable.

When gathering the data from multiple sources, it becomes necessary to combine them into a single value, $f_{p,m,q}$. As explained above, q=1, ... Q is being used for both microeconomic and macroeconomic variables. That is, q refers to the amount of variables, and Q and R the amount of betas. r is used here to describe the various external forecasting sources of one factor q (e.g., segment supply) in g (i.e., r refers to weighting one factor within g (factor g=1, ... Q) by various sources r1, r2, etc.) that can be combined to come up with q such that $BV_{j,m}(g) = \beta_0 + \Sigma_{r=q}^Q \beta_q g_{p,m,q} + \varepsilon_{j,m}$ (see Equation 18). In this way, one variable can reflect the data from multiple sources. As described above, one method for combining these values is to create a single value which gives more weight to the data source in which higher confidence is held. Following the above example notation (Equation 15), the combining equation at time $t_m$ for item j can be:

$$\hat{g}_{p,m,q} = \gamma_m \hat{g}_{(m|m-h),q} + (1-\gamma_m)\hat{g}'_{p,(m|m-h),q} \quad 0 \leq \gamma_m \leq 1 \quad \text{[Equation 16]}$$

where $$\gamma_m = \frac{\tau_m^2}{\tau_m^2 + \sigma_m^2} \quad \text{[Equation 17]}$$

Here, $\tau_m^2$ represents the squared estimation error for the externally-derived variable, $\hat{g}'_{p,(m|m-h),q}$, and $\sigma_m^2$, represents the squared estimation error for the externally-derived variable, $\hat{g}_{p,(m|m-h),q}$. "Externally" in this case means that they (e.g., external sources/variables) are outside of the equation and are not determined by the equation. After all of the variables have been collected reflecting their values from time period $t_{m-h}$, to $t_n$, the relationship between these variables and the modification/locality-adjusted base value, $BV_{j,m}$, can be expressed as a linear combination of input variables as follows:

$$BV_{j,m}(g) = \beta_0 + \Sigma_{r=q}^Q \beta_q g_{p,m,q} + \varepsilon_{j,m} \quad \text{[Equation 18]}$$

To determine the values of the Q+1 coefficients, $\beta_0, \ldots, \beta_Q$, the system may use the statistical method of OLS regression as shown in Equation 19:

$$\widehat{BV}_{j,m}(g) = \hat{\alpha}_0 + \Sigma_{q=1}^R \hat{\beta}_q g_{p,m,q} \quad \text{[Equation 19]}$$

where the estimated values, $\hat{\beta}_0, \ldots, \hat{\beta}_Q$, are chosen such that the sum of squared errors for item j (SSEj) as shown in Equation 20 is minimized.

$$SSE_j(f) = \Sigma_{m=0}^{h \leq n} (BV_{j,m}(g) - \widehat{BV}_{j,m}(g))^2 \quad \text{[Equation 20]}$$

The estimation of the linear coefficients $\hat{\beta}_0, \ldots, \hat{\beta}_Q$, need not be computed at every period. Rather, the coefficients can be updated periodically, for instance, at time $t_p$, and then used to forecast the value of $\widehat{BV}_{j,m}(f) = \hat{\beta}_0, \ldots \hat{\beta}_Q \ldots$, for any time period $t_m \geq t_p$.

As the final step, once the observed or forecasted values of $g_{p,n,q}$ are determined, the microeconomic factor can be estimated as shown in Equation 21 below.

$$\hat{G}_{i,n|n-h} = \left(\frac{\hat{\beta}_o + \sum_{r=1}^{R} \hat{\beta}_r g_{p,n,q}}{BV_{i,n}}\right) \text{ where } i \in p. \quad \text{[Equation 21]}$$

With all the pieces assembled, the system can generate a residual value for time $t_n$ for items i (519). As an example, this can be accomplished by substituting the values constructed in earlier steps into Equation 22 below.

$$\hat{V}_{i,h} = BV_{i,0} + ((\Sigma_{q=1}^{Q}\hat{\alpha}_{q f, n,q})(\hat{F}_{n|n-h} - F_{t0}) + (\Sigma_{r=1}^{QR}\hat{\beta}_r g_{p,n,q})(\hat{G}_{p,n|n-h} - G_{t0})) \; h=1, \ldots, H \quad \text{[Equation 22]}$$

Figure 11:
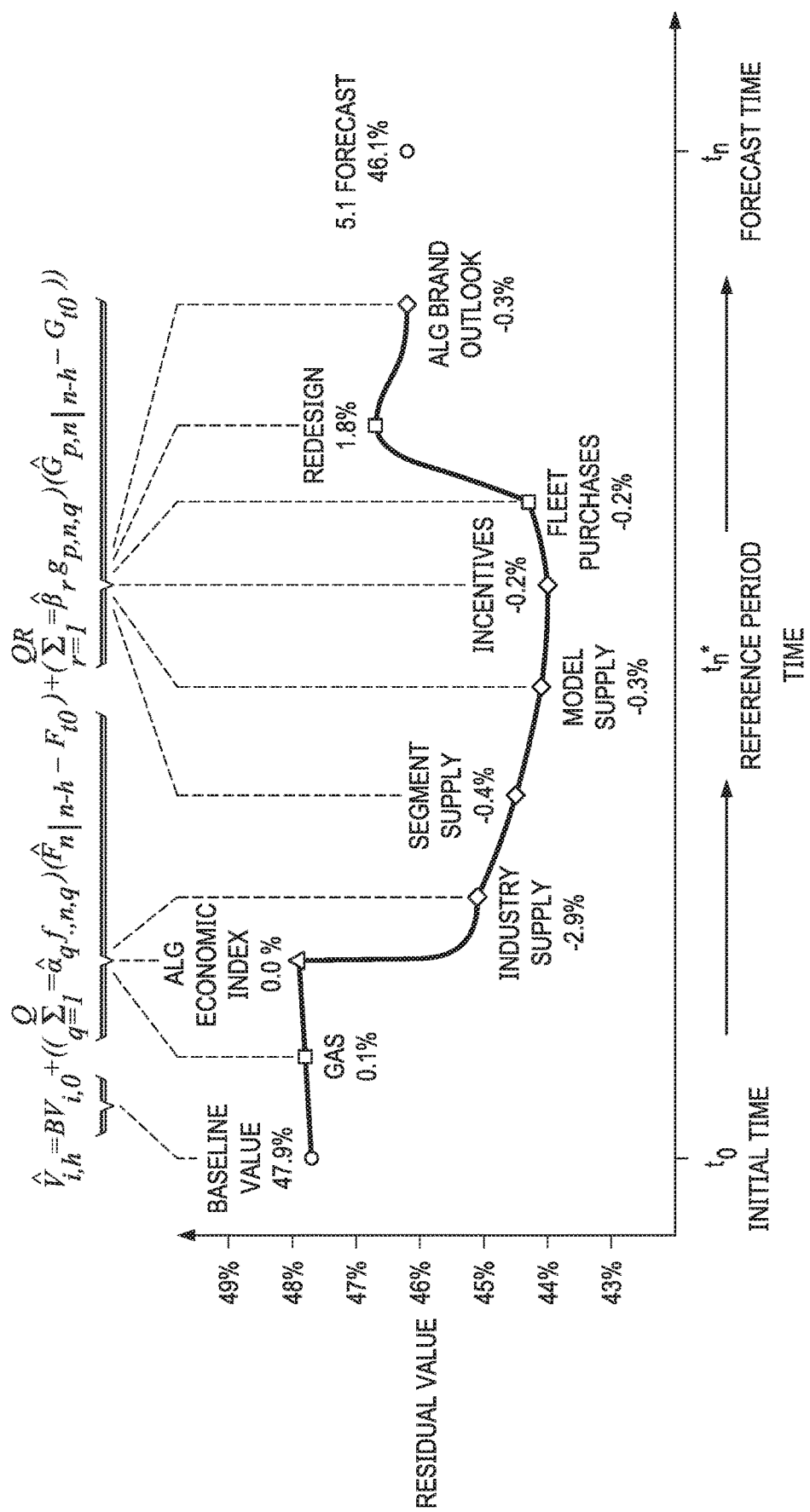
FIG. 11 depicts a plot diagram illustrating percentage points adjustments by factor, according to some embodiments disclosed herein.
Figure 12:
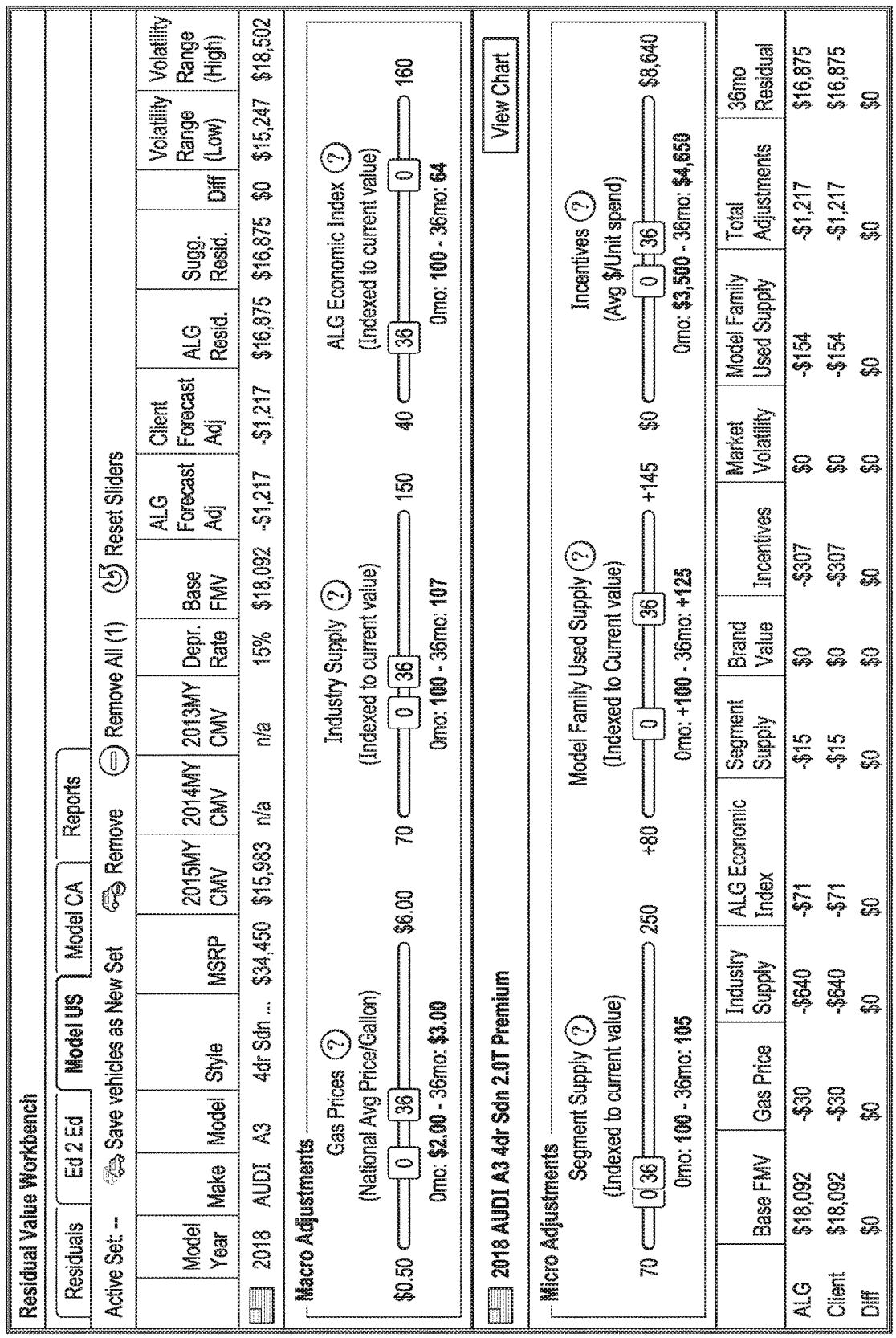
FIG. 12 depicts a diagrammatic representation of a user interface of a workbench application, according to some embodiments disclosed herein.

Equation 22 and its computational components (with their corresponding driving factors) are illustrated in FIG. 11 which depicts a plot diagram illustrating percentage points adjustments by factor, according to some embodiments disclosed herein. In the example of FIG. 11, the first computational component ($\hat{V}_{i,h}$) is driven by the baseline value of the item of interest (over a historical average), the second computational component (($\Sigma_{q=1}^{Q}\hat{\alpha}_{q f, n,q})(\hat{F}_{n|n-h} - F_{t0})$) is driven by a number of macroeconomic factors, such as gas, ALG economic index, and industry supply), and the third computational component (($\Sigma_{r=1}^{QR}\hat{\beta}_r g_{p,n,q})(\hat{G}_{p,n|n-h} - G_{t0})$) is driven by a number of microeconomic factors such as segment supply (e.g., the supply level of a used vehicle market segment of interest), model supply (e.g., the supply level of a used vehicle model of interest), incentive spending (e.g., incentives offered by the vehicle manufacturer of the vehicle model of interest), rental fleet penetration, redesign, and ALG brand outlook or value. Rental fleet penetration reflects a percentage of new cars entering the rental fleet. For instance, 2,000 of 20,000 new cars sold in a month to a rental company means a 10% rental fleet penetration. Redesign refers to vehicle updates such as a complete new generation (e.g., a complete new model), minor updates (e.g., frontend design changes), or major updates (e.g., interior changes, new powertrain, etc.). Brand outlook or value refers to a measure used by a brand to determine a level of brand trending. Brand outlook can be measured statistically in the used transaction data where the brand rank order in the data can be identified. Consumer surveys can also be used to rank brands.

Optionally, residual value forecasting method 500 may further comprise performing one or more quality assurance (QA) operations on the generated output (521). In some embodiments, the system may compare the forecasted values with a set of reference values. The time point at which the forecasted residual curve is aligned occurs at $t^*_n$ selected previously (see 505). The approach for adjusting $\hat{V}_{i,n}$ for QA purposes may include the following steps:

a. Gather residual values from other vehicles in the competitive set (see FIG. 9, which shows a final adjustment based on competitive set comparison). These may include:

The average residual value at $t^*_n$ for the entire competitive set $U_k$;

The baseline value $BV_{j,0}$ at to for item j in the same competitive set that is most similar (best match) to item i; and The residual value of item k that is a previous version of item i (not a modification of item i, but the one that was replaced in production by item i), if it exists.

b. Compute the adjustment value, $C_{iU,n|n^*}$, that will minimizes the weighted average error relative to the position implied by the reference points as shown in Equation 23 below:

$$C_{iU,n|n^*} = \Delta[(\alpha V_{U,n} + \beta BV_{j,0} + \Gamma V_{k,n}) - V_{i,n}] \quad \text{[Equation 23]}$$

where $\alpha$, $\beta$, $\Gamma$ are assigned weights, $\alpha+\beta+\Gamma=1$ and $\alpha,\beta,\Gamma>0$, $\Delta$ is a weight depending on whether item i at $t_n$ is completely new in the market ($\Delta=1$) or established ($\Delta<1$).

If necessary, the system may adjust the output from Equation 22 with the output from Equation 23 to generate a final forecast of residual value of the item (523). As an example, the system may adjust $\hat{V}_{i,n}$ by $C_{iU,n|n^*}$ to get the final forecasted value:

$$\hat{V}_{i,h} = BV_{i,0} + ((\Sigma_{q=1}^{Q}\hat{\alpha}_q {}_{f,n,q})(\hat{F}_{n|n-h} - F_{t0}) + (\Sigma_{r=1}^{R}\hat{\beta}_r g_{p,n,q})(\hat{G}_{p,n|n-h} - G_{t0})) + C_{iU,n|n^*} \; h=1, \ldots, H \quad \text{[Equation 24]}$$

Figure 9:
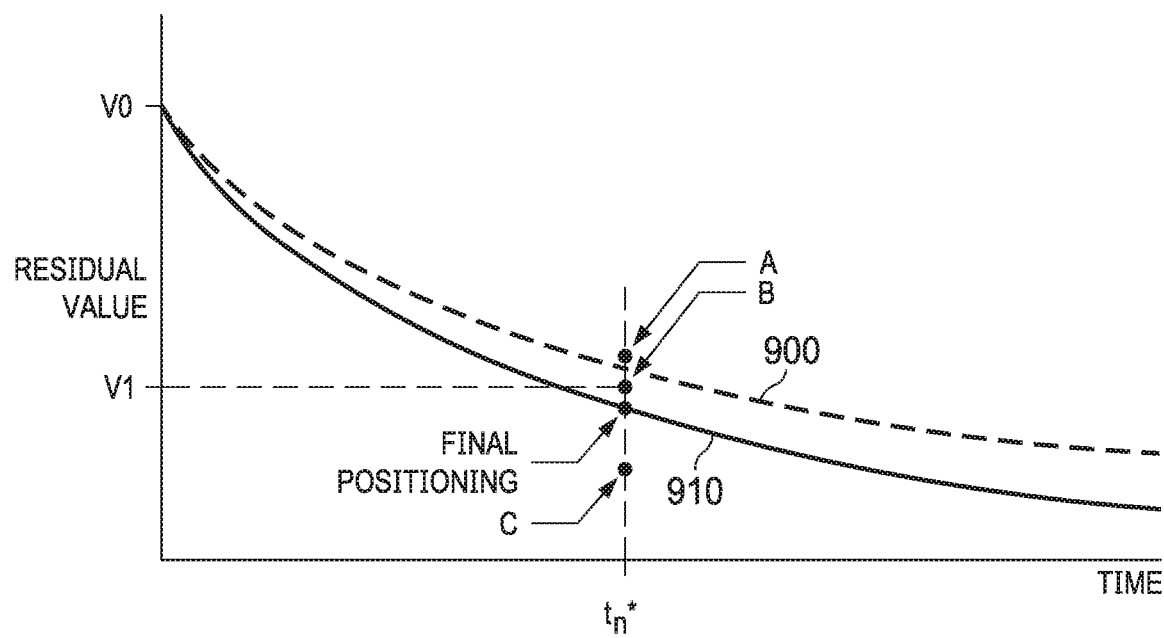
FIG. 9 depicts a plot diagram illustrating an example of a residual value curve adjusted based on competitive set comparison, according to some embodiments disclosed herein.

Referring to FIG. 9, an exemplary residual curve adjustment is shown. In FIG. 9, the dotted line (900) represents the initial computation of the curve. Points A, B, and C represent the average residual values of the competitive set, the current market value of the best matching item in the competitive set, and the previous value of the item of interest, respectively. Taking these data points into account, the final revised residual curve is shown as line 910.

Figure 6:
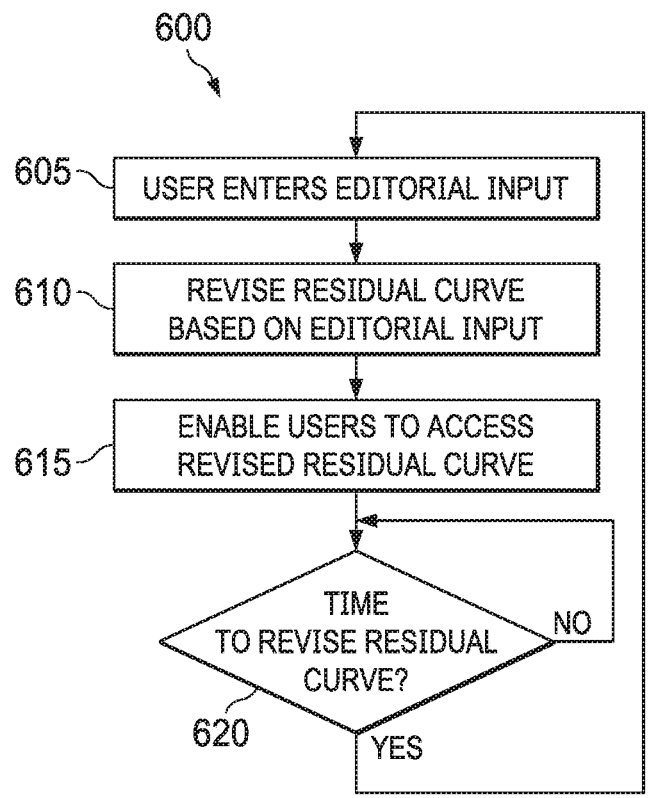
FIG. 6 is a flow diagram illustrating an example of a method for optionally revising a generated residual value curve based on qualitative input via a feedback cycle, according to some embodiments disclosed herein.

FIG. 6 is a flow diagram illustrating an example of a method for optionally revising a generated residual value curve based on qualitative input via a feedback cycle, according to some embodiments disclosed herein.

In some embodiments, after a baseline residual curve has been generated and stored in a local data storage device, a user of the enterprise computing environment can provide editorial input (605) that is used to revise the residual curve (610). The editorial input may be provided to account for any factors that were not accounted for in the generation of the baseline curve, or that have changed since the baseline curve was generated. The editorial input may also be provided to determine the potential effect of various factors on the residual curve. The editorial input may be provided through a workbench application (see, e.g., FIG. 12) that allows the user to see the results of the input. The residual curve that is revised according to the editorial input can then be made "live" (615). In other words, the revised residual curve can be stored or published to a location to which client access can be enabled. The system allows for periodic revision of the residual curve. If it is time to do so (620) (e.g., if a predetermined interval has been reached), the user can provide additional editorial input (605) for generation of a newly revised residual curve (610), which can then be published for access by the client (615).

In one embodiment, the residual curve is updated at regular intervals. The updated residual curve can be stored in place of the previous baseline curve and used as the baseline for future use. When the residual curve is updated, several comparisons are made to ensure that the newly revised curve is reasonable. For example, the revised curve is compared to the previous curve to determine whether the values of the new curve differ from the previous curve by a substantial amount. If the difference is too great, this may indicate that the inputs to the revised curve are not realistic. The inputs may therefore be adjusted to bring the revised residual curve closer to the previous curve. In one embodiment, the residual curve is also adjusted based on the current values of items in a competitive set. For instance, the curve may be adjusted to bring the curve closer to the value of a closest competitive item, or to the average value of the set of competitive items.

Figure 7:
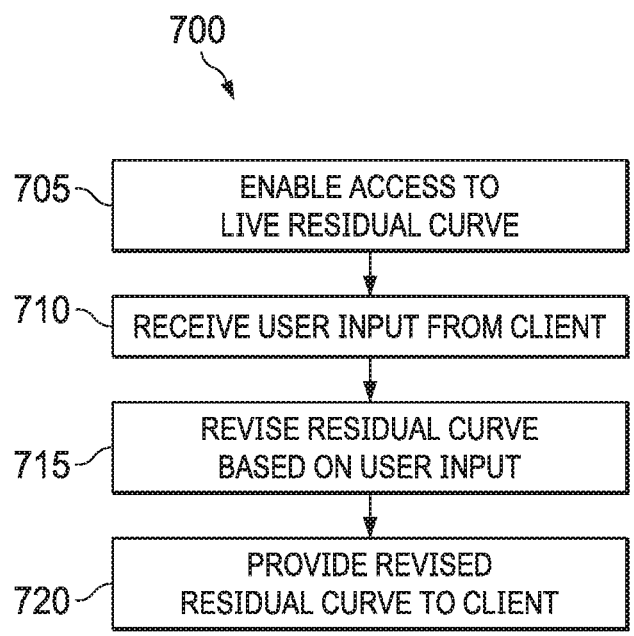
FIG. 7 is a flow diagram illustrating an example of a method for optionally allowing a client to provide qualitative input on a generated residual value curve, according to some embodiments disclosed herein.

FIG. 7 is a flow diagram illustrating an example of a method for optionally allowing a client to provide qualitative input on a generated residual value curve, according to some embodiments disclosed herein.

In some embodiments, after a baseline residual curve is revised, the server may enable access by a client to the revised curve (705). Customers can access the residual curve through the client to determine the value of the item at some point in the future. The client in this embodiment includes a workbench application that allows the customer to vary some of the factors that affect the residual curve and to view the resulting changes to the residual curve. The server receives input from the client's workbench application (710) and revises the residual curve according to the received input (715). The newly revised residual curve is then provided to the client (720) so that it can be viewed by the customer.

Example Implementation in Automotive Industry

The following describes an exemplary implementation in which the approach described above is adapted to be used to estimate the value of automobiles over time and thereby allows the resale values that could be expected at future time points to be determined. Residual values thus estimated can provide guidelines for pricing fixed-term vehicle leases which captures the expected change in value that will result in the time interval between the leased vehicle's acquisition at time to and its disposition at time $t_d$. This example implementation not only can provide the estimated residual value at disposition, $V_{i,d}$, but can also forecast values at equally-spaced fixed points between $t_0$ and $t_d$, thereby allowing construction of a residual curve that captures the relationship between vehicle value and time. Over time and as new information becomes available, this example implementation continues to timely reflect changing values of exogenous macroeconomic and industry-specific microeconomic variables and vehicle-specific, endogenous variables (depreciation, competitive sets, and modifications).

In this example implementation, the guidelines for production of the residual values include:

The residual values must be realistic and adjusted over the vehicle's lifecycle to reflect the market, incentives and fleet purchases.

To enable vehicle manufacturers to market their vehicles, residual values must create clear, consistent messages across all vehicles being valued.

To remain relevant and timely, the residual values must reflect product enhancements, packaging/content adjustments, etc.

To provide utility to each manufacturer's ecosystem, the residual values must encompass all phases of the automotive sales cycle, including dealer engagement, manufacturer support, cooperation on pricing, and off lease supply management.

In this example, the methodology described above is adapted to estimate residual values of cars and light trucks in the United States and Canada. Estimates are updated every two months to reflect new observed data, market conditions, and macroeconomic estimates. As an example of this embodiment, the latest 2017 Model Year (MY) Hyundai Elantra SE with automatic transmission (AT)—which sells at popular equipped MSRP of $19,785 in California—will be used (see FIG. 4 for an image). This particular model has some historical used market value and residual value data available to estimate the future value of the vehicle. Furthermore, exogenous macroeconomic data and microeconomic data as well as endogenous factors (e.g., depreciation rate and competitive knowledge) are readily available to construct the current residual value curve for this vehicle at any term (e.g., 12-month, 24-month, 36-month, . . . , 60-month or any term in between).

Step 1. Determine a baseline, unmodified value for the item i, $V_{i,h}$. The 2014 MY Hyundai Elantra SE AT (item i) baseline value for $t_0$ is $V_{i,h}$=$11,075 and is based on an observed current market value (CMV) derived from auction data. Roughly 990 auction records were available in an h estimation period for item i to create the CMV of $11,078 by applying statistical filters and other measures to cleanse the data. For the purpose of illustration and not of limitation, auction records may include such information as: Sale Date; National Automobile Dealers Association (NADA) Vehicle Identification Code; Make; Sub-make; Model Year; Series; Body Style; Diesel 4WD Identifier; NADA Region code; Sale Price; Mileage; Sale Type; Vehicle Identification Number (VIN); Vehicle Identifier (VID); etc.

Step 2. At time $t_n$=0, determine a reference period, $t_{n*}$, at which adjustments will be made to align values with other items in the competitive set based on the following industry-level frequencies that constrain the choice of $t_{n*}$:

auction data is updated weekly yet also aggregated to monthly numbers, while microeconomic factors and macroeconomic factors are updated monthly;

forecasted terms go up to 72-month, $t_{max}$ is greater than 72-month;

most common terms are 12, 24, 36, 48, and 60-month terms and, mostly, 36-month is used.

Because a 36-month alignment is commonly used in the automotive industry, a value of $t_{n*}$=36 months is used in this example for the reference period relative to the baseline.

Step 3. At time $t_n$=0, determine the constant width of time intervals $\Delta_{(p,q)}$ at which forecasts will be generated. In this case, the selection of $\Delta_{(p,q)}$ is determined by considering the following constraints:

It must be chosen such that $(t_{n*}-t_0)/\Delta_{(p,q)}$ is a positive integer where $t_{n*}-t_0$=36 months.

It must be greater than or equal to $$\varphi^* = \min_r(\varphi_r) = \text{weekly since}$$

that is the frequency at which the macroeconomic data is updated.

Given those constraints and a choice of $t_{n*}$=36, the $\Delta_{(p,q)}$=2 months is used.

36-month term/2 month=18>0.

Interval is greater than $\varphi^*$ (weekly data).

Step 4. Determine a locality adjustment, $L_p$. If the base value of the items in industry p to which item i is assigned varies by geographic region, then compute $$L_{p,n} = \frac{L'_{p,n}(z)}{L'_{p,n}(Z)}$$

where $L'_{p,n}(z)$ is the average cost of items in industry p in locality z at time $t_n$, and $L'_{p,n}(Z)$ is the local cost of items in industry p across all localities ($z \in Z$) at time $t_n$. In this example, the residual value of the 2017MY Hyundai Elantra SE AT is being established for California, located in the z="US West" region of the U.S. And where $L_{west}$=1/1, local adjustment for U.S. Western region is 100% of the average for all regions in the U.S.

Step 5. Collect or estimate incremental values of modifications, $M_{i,n}$, to the base configuration of the item. In this example, the vehicle has cruise control added as popularly equipped which retains a measurable and tangible value of $375 at 36-month. Thus, $M_{Elantra,36-month}$=$375 for all regions, $M_{Elantra,36-month}$+($375*1.0). For U.S. Western region.

Step 6. Determine the locality-adjusted value of the modified item i at time $t_n$ by adjusting the base configuration's value to account for modifications and locality adjustments.

$$BV_{i,n} = (V'_{i,0} + M_{i,n}) \times (\tau_{i,n} \times L_{p,n}) = (\$11,075 + \$375) * 1.0 = \$11,450$$

Step 7. Construct competitive sets, $C_{iW,n}$, of similar and substitute items in the same industry, p. This involves determining what factors to compare to for each competitor and establishing a matrix such as pricing (e.g., MSRP), engine and performance (e.g., horse power, mile per gallon, torque, displacement, etc.), exterior (e.g., curb weight, wheelbase, length, width, height, wheels size, etc.), interior (e.g., dimensions, features, air conditioning, entertainment system, seats, etc.) And safety.

Based on the factors above and the matrix analysis, for example, the 2014 Honda Civic LX AT has the most similarities to the 2014 Hyundai SE AT, followed by 2014 Toyota Corolla L AT.

Step 8. Collect macroeconomic data, $F_{.,n|n-h}$, and either forecast future levels or incorporate existing forecasts from other sources to determine $\hat{F}_{.,n|n-1}$.

As an example, suppose the ALG economic index, industry-wide used market supply index, and gas prices are collected at $t_0$ and forecasted for $t_n$ (see, e.g., FIG. 11). Further suppose the ALG economic index is equal to 100 index points, industry-wide used market supply index is equal to 100 index points, and average gas prices are $2.09 per gallon in $t_0$, whereas the forecasts are 111 points for the ALG economic index, 123 points for industry wide used market supply, and $2.67 for gas price in $t_{36-month}$. The various factors have coefficients which determined based on correlation to auction data and thus the impact on the forecasted values can be applied by using the coefficients. Hence, for example, based on the change in the ALG economic index from currently 100 to 111 in 36-month, the impact on 36-month residual values is an incremental $60, from industry wide used market supply −$450, and from gas prices $165. The total adjustment for macroeconomic variables is −$225 or, mathematically, +a1*(111-100)−a2*(11.5-11.0 million)+a3*($3.00-$3.50)=$60-$450+$165=−$225.

Step 9. Collect microeconomic data, $G_{p,n|n-h}$, for the industry in which the item being evaluated is classified and forecast future levels or incorporate existing forecasts from other sources to determine $\hat{G}_{p,n|n-h}$.

Microeconomic data such as segment-level and model-level used vehicle market supply, brand value, incentive spending, and rental fleet penetration is generated for $t_0$ and forecasted for $t_{36-month}$. For example, current incentive spending for the Elantra is $2,600, yet the forecast is expected to be at $2,550. Based on the change in incentive spending from today to 36-month, the impact is $15, brand value $100, and used vehicle market supply (at the segment level and the model level) −$160 (see Equations 16-21). The total adjustment for microeconomic variables is −$45, or mathematically, −b1*($1,900-$2,000)−b2*(20-18 index points)−b3*(100-120)=$15+$100-$160=−$45.

Step 10. With all the pieces assembled, forecasting the residual value for time $t_{n*}=36$ month for the 2017 Hyundai Elantra SE AT (cruise control, in California) can be done by substituting the values constructed in earlier steps into Equation 22:

$$\hat{V}_{i,h} = BV_{i,0} + \left(\left(\sum_{q=1}^{Q} \hat{\alpha}_q f_{.,n,q}\right)(\hat{F}_{n|n-h} - F_{t0}) + \left(\sum_{r=1}^{R} \hat{\beta}_r g_{p,n,q}\right)(\hat{G}_{p,n|n-h} - G_{t0})\right)$$

$$= (\$11,075 + \$375) * 1.0 + ((-\$225) + (-\$45))$$

$$= \$11,450 - \$270$$

$$= \$11,180$$

Step 11. Perform quality assurance (QA). In this example, this involves computing the adjustment value, $C_{iU,n|n*}$ (see Equation 23) that will minimizes the weighted average error relative to the position implied by the reference points.

In this example, adjustment value in the case of the Camry LE AT is small since Δ<1, plenty of history is available. The average residual value of entire competitive set is $10,840 and the following factors are taken into account:
i. Baseline of the closest competitor(s) is $11,465
ii. 2014 MY Hyundai Elantra SE AT is $11,120

Applying Equation 23 described above, the adjustment value $C_{iU,n|n*}$ is then equal to: 0.25×((0.33×$10,840+0.33×$11,120+0.33×$11,465)−$11,180)=−$38

Step 12. Adjust $\hat{V}_{i,h}$ by $C_{iU,n|n*}$ to determine the final forecasted value:

In this example, applying Equation 24 described above, the final forecast for the 2017 MY Hyundai Elantra SE AT for the Western region for time $t_{n*}=36$ month is $11,180-$38=$11,142.

Embodiments disclosed herein can provide many advantages. For example, knowledge of the future residual values can be used to:
a) Set leasing rates of an item which reflect the expected change in valuation of the item between the beginning and ends of a fixed lease period—a useful metric that can be used in the rental industry.
b) Determine the amount at which an item can be resold at any time period—a useful metric that can be used in investment decisions such as real estate.
c) Provide information supporting the strategic planning decisions made of the manufacturer of item i.
d) Determine if the change in value will be constant over time intervals of the same length.

These, and other, aspects of the disclosure and various features and advantageous details thereof are explained more fully with reference to the exemplary, and therefore non-limiting, embodiments illustrated and detailed in this disclosure. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments discussed herein can be implemented in a computer communicatively connected to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like. In embodiments of the invention, the computer has access to at least one database over a network connection.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network.

Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software embodied on hardware, firmware or any combination thereof.

Embodiments described herein can be implemented in the form of control logic in hardware or a combination of software and hardware. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "computer" or "processor" may include any hardware system, mechanism or component that processes data, signals or other information. A computer or processor can include a system with a general-purpose central processing unit, multiple processing units, dedicated circuitry for achieving functionality, or other systems. Processing need not be limited to a geographic location, or have temporal limitations. For example, a computer or processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for generating forecasts of residual values of an item of interest in an industry, the method comprising:
   programmatically receiving or obtaining, by a system, used market data, non-industry-specific data, and industry-specific data from multiple data sources, the system having a processor and a non-transitory computer-readable medium;
   transforming, by the system, the used market data, the non-industry-specific data, and the industry-specific data into data representations internal to the system;
   applying, by the system, the data representations of the used market data, the non-industry-specific data, and the industry-specific data as input to a residual value forecasting model, the residual value forecasting model having a first computational component driven by a baseline value for the item of interest, a second computational component driven by macroeconomic factors not specific to the industry, and a third computational component driven by microeconomic factors specific to the industry, the first computational component having a baseline value variable for representing the baseline value for the item of interest with a base configuration at an initial time point, the second computational component having a macroeconomic factor represented by a linear combination of macroeconomic variables that represent macroeconomic features under consideration for the item of interest, the third computational component having a microeconomic factor represented by a linear combination of microeconomic variables that represent microeconomic features specific to the industry, the applying producing a forecasted residual value for the item of interest at a future time point; and
   providing the forecasted residual value for the item of interest for presentation on a client device.

2. The method according to claim 1, further comprising:
   determining the baseline value for the item of interest, the determining comprising deriving, from auction data, an observed current market value of the item of interest with the base configuration at the initial time point;
   determining, at the initial time point, a reference period at which adjustments are to be made to the item of interest for value alignment with items that compete with the item of interest in the industry;
   determining, at the initial time point based at least on the initial time point and the reference period, a constant width of time intervals at which forecasts are to be generated for the item of interest;
   determining a locality adjustment to the item of interest, the locality adjustment determined at the initial time point and at a time a value modification being made to account for a modification to the item of interest;
   collecting or determining incremental values of modifications to the base configuration of the item of interest;
   determining, based at least on the locality adjustment and the incremental values of modifications to the base configuration of the item of interest, a locality-adjusted value of the item of interest having the modifications to the base configuration;
   constructing competitive sets of similar and substitute items in the industry, the constructing comprising partitioning items that compete with the item of interest in the industry based on a measure of similarity between pairs of the items;
   determining the macroeconomic factor by computing the linear combination of macroeconomic variables that represent the macroeconomic features under consideration for the item of interest,
   determining the microeconomic factor by computing a linear combination of observed or forecasted values of the microeconomic variables that represent the microeconomic features specific to the industry; and
   computing the first computational component, the second computational component, and the third computational component of the residual value forecasting model utilizing the baseline value for the item of interest, the locality-adjusted value of the item of interest having the modifications to the base configuration, the macroeconomic factor, and the microeconomic factor thus determined.

3. The method according to claim 2, further comprising:
   computing, utilizing a baseline value of a closest competing item in the competitive sets, an adjustment value; and
   generating a final forecasted residual value for the item of interest by adjusting the forecasted residual value for the item of interest with the adjustment value.

4. The method according to claim 2, wherein the modifications to the base configuration of the item of interest comprise value-affecting changes to the item of interest at any time point.

5. The method according to claim 2, further comprising:
combining values received or obtained from the multiple data sources into a single value which gives more weight to a data source or data type in which a higher confidence is held, the combining including computing a combining equation at a time point in the reference period for a similar or substitute item that competes with the item of interest in the industry.

6. The method according to claim 2, wherein the reference period is 36 months and wherein the constant width of time intervals is two months.

7. The method according to claim 1, wherein the second computational component further includes a coefficient for the macroeconomic factor and wherein the third computational component further includes a coefficient for the microeconomic factor.

8. The method according to claim 1, wherein the used market data comprises open auction data, closed auction data, and certified pre-owned data.

9. The method according to claim 1, wherein the non-industry-specific data comprises at least one of inflation, unemployment rate, gas prices, an economic index, interest rates, or industry-wide used market supply.

10. The method according to claim 1, wherein the industry-specific data comprises vehicle-specific data and wherein the vehicle-specific data comprises modifications to the base configuration of the item of interest.

11. A system for generating forecasts of residual values of an item of interest in an industry, the system comprising:
a processor;
a non-transitory computer-readable medium; and
stored instructions translatable by the processor to perform:
programmatically receiving or obtaining used market data, non-industry-specific data, and industry-specific data from multiple data sources;
transforming the used market data, the non-industry-specific data, and the industry-specific data into data representations internal to the system;
applying the data representations of the used market data, the non-industry-specific data, and the industry-specific data as input to a residual value forecasting model, the residual value forecasting model having a first computational component driven by a baseline value for the item of interest, a second computational component driven by macroeconomic factors not specific to the industry, and a third computational component driven by microeconomic factors specific to the industry, the first computational component having a baseline value variable for representing the baseline value for the item of interest with a base configuration at an initial time point, the second computational component having a macroeconomic factor represented by a linear combination of macroeconomic variables that represent macroeconomic features under consideration for the item of interest, the third computational component having a microeconomic factor represented by a linear combination of microeconomic variables that represent microeconomic features specific to the industry, the applying producing a forecasted residual value for the item of interest at a future time point; and
providing the forecasted residual value for the item of interest for presentation on a client device.

12. The system of claim 11, wherein the stored instructions are further translatable by the processor to perform:
determining the baseline value for the item of interest, the determining comprising deriving, from auction data, an observed current market value of the item of interest with the base configuration at the initial time point;
determining, at the initial time point, a reference period at which adjustments are to be made to the item of interest for value alignment with items that compete with the item of interest in the industry;
determining, at the initial time point based at least on the initial time point and the reference period, a constant width of time intervals at which forecasts are to be generated for the item of interest;
determining a locality adjustment to the item of interest, the locality adjustment determined at the initial time point and at a time a value modification being made to account for a modification to the item of interest;
collecting or determining incremental values of modifications to the base configuration of the item of interest;
determining, based at least on the locality adjustment and the incremental values of modifications to the base configuration of the item of interest, a locality-adjusted value of the item of interest having the modifications to the base configuration;
constructing competitive sets of similar and substitute items in the industry, the constructing comprising partitioning items that compete with the item of interest in the industry based on a measure of similarity between pairs of the items;
determining the macroeconomic factor by computing the linear combination of macroeconomic variables that represent the macroeconomic features under consideration for the item of interest,
determining the microeconomic factor by computing a linear combination of observed or forecasted values of the microeconomic variables that represent the microeconomic features specific to the industry; and
computing the first computational component, the second computational component, and the third computational component of the residual value forecasting model utilizing the baseline value for the item of interest, the locality-adjusted value of the item of interest having the modifications to the base configuration, the macroeconomic factor, and the microeconomic factor thus determined.

13. The system of claim 12, wherein the stored instructions are further translatable by the processor to perform:
computing, utilizing a baseline value of a closest competing item in the competitive sets, an adjustment value; and
generating a final forecasted residual value for the item of interest by adjusting the forecasted residual value for the item of interest with the adjustment value.

14. The system of claim 12, wherein the modifications to the base configuration of the item of interest comprise value-affecting changes to the item of interest at any time point.

15. The system of claim 12, wherein the stored instructions are further translatable by the processor to perform:
combining values received or obtained from the multiple data sources into a single value which gives more weight to a data source or data type in which a higher confidence is held, the combining including computing a combining equation at a time point in the reference period for a similar or substitute item that competes with the item of interest in the industry.

16. The system of claim 12, wherein the reference period is 36 months and wherein the constant width of time intervals is two months.

17. The system of claim 11, wherein the second computational component further includes a coefficient for the macroeconomic factor and wherein the third computational component further includes a coefficient for the microeconomic factor.

18. The system of claim 11, wherein the used market data comprises open auction data, closed auction data, and certified pre-owned data.

19. The system of claim 11, wherein the non-industry-specific data comprises at least one of inflation, unemployment rate, gas prices, an economic index, interest rates, or industry-wide used market supply.

20. The system of claim 11, wherein the industry-specific data comprises vehicle-specific data and wherein the vehicle-specific data comprises modifications to the base configuration of the item of interest.

* * * * *